(12) United States Patent
Campbell et al.

(10) Patent No.: US 6,552,144 B1
(45) Date of Patent: Apr. 22, 2003

(54) PROCESS FOR THE CONTINUOUS PRODUCTION OF GEL FREE POLYMERS, AND POWDER AND LIQUID COATING APPLICATIONS CONTAINING GEL FREE POLYMERS

(75) Inventors: J. David Campbell, Racine, WI (US); Michihiro Kaai, Toyoake (JP); Yasuhiko Mori, Nagoya (JP); Alan J. Pekarik, Spring, TX (US); Warunee Srisiri-Sisson, Mount Pleasant, SC (US); Marco A. Villalobos, Racine, WI (US)

(73) Assignee: Johnson Polymer, Inc., Sturtevant, WI (US)

( * ) Notice: Subject to any disclaimer, the term of this patent is extended or adjusted under 35 U.S.C. 154(b) by 0 days.

(21) Appl. No.: 09/614,402

(22) Filed: Jul. 12, 2000

Related U.S. Application Data
(60) Provisional application No. 60/219,334, filed on Jul. 14, 1999.

(51) Int. Cl.$^7$ ................................................. C08F 24/00
(52) U.S. Cl. ...................... 526/273; 526/310; 526/312; 526/319; 526/317.1; 526/318.2; 526/318.3; 526/318.5; 526/320; 526/328.5; 526/329.7; 427/386; 428/357
(58) Field of Search .................. 526/319, 329.7, 526/310, 312, 318.2, 318.3, 318.5, 320, 321, 328.5, 273, 317.1; 428/357; 427/386

(56) References Cited

U.S. PATENT DOCUMENTS

| | | | |
|---|---|---|---|
| 3,458,467 A | 7/1969 | Herrle et al. | |
| 3,859,268 A | 1/1975 | Novack et al. | |
| 3,884,857 A | 5/1975 | Ballard et al. | |
| 3,893,977 A | * 7/1975 | Wingler | 524/902 |
| 3,968,059 A | 7/1976 | Shimada et al. | |
| 4,016,341 A | 4/1977 | Ogawa et al. | |
| 4,105,838 A | 8/1978 | Kitamura et al. | |
| 4,105,839 A | 8/1978 | Koyanagi et al. | |
| 4,146,690 A | 3/1979 | Tago et al. | |
| 4,196,272 A | 4/1980 | Goretta et al. | |
| 4,220,743 A | 9/1980 | Englin | |
| 4,344,993 A | 8/1982 | Schmidt et al. | |
| 4,374,963 A | 2/1983 | Morgan et al. | |
| 4,414,370 A | 11/1983 | Hamielec et al. | |
| 4,517,344 A | 5/1985 | Mitani et al. | |
| 4,529,787 A | 7/1985 | Schmidt et al. | |
| 4,539,230 A | 9/1985 | Shimizu et al. | |
| 4,546,160 A | 10/1985 | Brand et al. | |
| 4,559,156 A | 12/1985 | Greaves et al. | |
| 4,604,411 A | 8/1986 | Yada et al. | |
| 4,613,483 A | 9/1986 | Cohen | |
| 4,661,569 A | 4/1987 | Kleine et al. | |
| 4,737,403 A | * 4/1988 | Simpson et al. | 427/389.8 |
| 4,764,430 A | * 8/1988 | Blackburn et al. | 427/407.1 |
| 4,795,800 A | 1/1989 | Yamauchi et al. | |
| 4,917,955 A | * 4/1990 | Porter et al. | 427/407.1 |
| 4,927,868 A | * 5/1990 | Schimmel et al. | 523/439 |
| 4,954,567 A | 9/1990 | Oishi et al. | |
| 4,957,982 A | 9/1990 | Geddes | |
| 5,010,166 A | 4/1991 | Scholsky et al. | |
| 5,055,524 A | * 10/1991 | Pettit et al. | 525/172 |
| 5,091,503 A | 2/1992 | Inatome et al. | |
| 5,130,369 A | 7/1992 | Hughes et al. | |
| 5,256,452 A | 10/1993 | McMonigal et al. | |
| 5,276,097 A | 1/1994 | Hoffmann et al. | 525/167 |
| 5,292,803 A | 3/1994 | Ohmae et al. | |
| 5,352,750 A | 10/1994 | Yanai et al. | |
| 5,354,802 A | 10/1994 | Shiwaku et al. | |
| 5,397,641 A | * 3/1995 | Moens et al. | 427/372.2 |
| 5,399,612 A | 3/1995 | Calhoun | |
| 5,508,366 A | 4/1996 | Andrist et al. | |
| 5,521,267 A | 5/1996 | Giencke et al. | |
| 5,523,135 A | 6/1996 | Shiwaku et al. | |
| 5,539,022 A | 7/1996 | Schmidt et al. | |
| 5,596,057 A | 1/1997 | Epple et al. | |
| 5,665,822 A | 9/1997 | Bitler et al. | |
| 5,670,006 A | 9/1997 | Wilfong et al. | |
| 5,679,735 A | 10/1997 | Geissler et al. | |
| 5,719,212 A | 2/1998 | Nakae et al. | |
| 5,728,793 A | * 3/1998 | Kumagai et al. | 526/224 |
| 5,744,522 A | * 4/1998 | Prucnal et al. | 523/442 |
| 6,255,403 B1 | * 7/2001 | Andrist et al. | 525/326.1 |
| 6,346,590 B1 | * 2/2002 | Campbell et al. | 526/210 |

FOREIGN PATENT DOCUMENTS

| | | |
|---|---|---|
| EP | 0127236 A | 12/1984 |
| EP | 0 256 369 | 2/1988 |
| EP | 0 879 852 | 11/1998 |
| EP | 0 885 906 | 12/1998 |
| EP | 0 896 027 | 2/1999 |
| GB | 799474 | 8/1958 |
| GB | 1576597 | 10/1980 |
| JP | XP002150691 | 3/1983 |
| JP | 58 053901 A | 3/1983 |
| WO | WO 98/04593 | 2/1998 |
| WO | WO99/07754 | 2/1999 |

* cited by examiner

Primary Examiner—Tatyana Zalukaeva
(74) Attorney, Agent, or Firm—Renee J. Rymarz; Warren R. Bovee; Neil R. Hamilton

(57) ABSTRACT

A process is disclosed for a continuous, high temperature polymerization process for preparing a gel free polymeric product. The process comprises continuously charging into a reactor at least one monomer such that the reactor is filled to 100 percent of its usable volume. The reactor is maintained at an effective temperature for an effective period of time to cause polymerization of the monomers into a polymeric product, such that the polymeric product is formed substantially free of gel particles.

37 Claims, 12 Drawing Sheets

FIG. 11 Effect of CHA on Non-Functional Methacrylate Conversion

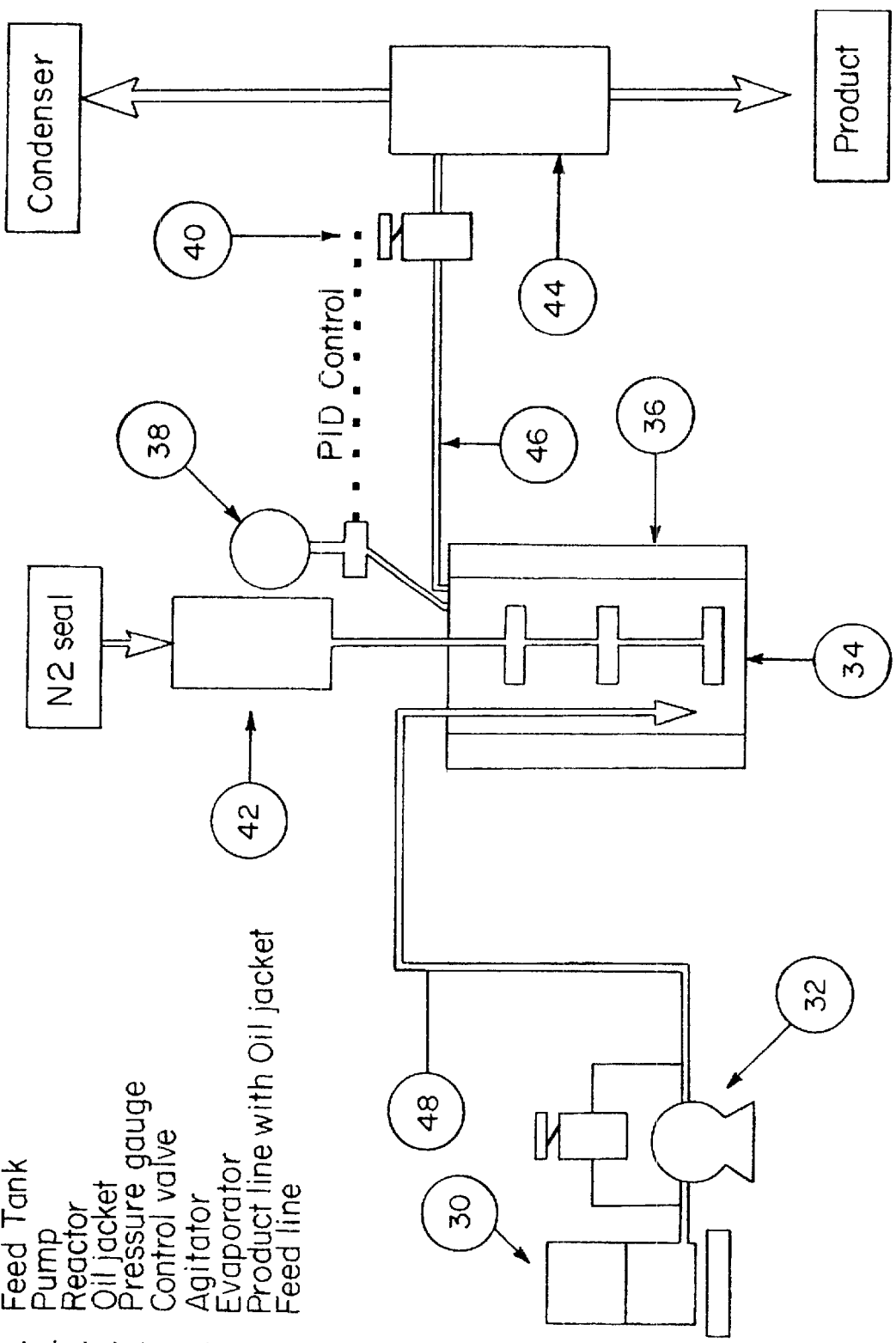
FIG. 13 Liquid Full Reactor Process
30. Feed Tank
32. Pump
34. Reactor
36. Oil jacket
38. Pressure gauge
40. Control valve
42. Agitator
44. Evaporator
46. Product line with Oil jacket
48. Feed line

PROCESS FOR THE CONTINUOUS PRODUCTION OF GEL FREE POLYMERS, AND POWDER AND LIQUID COATING APPLICATIONS CONTAINING GEL FREE POLYMERS

This application claims priority from U.S. Patent Application No. 60/219334, filed Jul. 14, 1999, the entire contents of which are hereby incorporated by reference.

FIELD OF THE INVENTION

The present invention relates to a continuous process for the production of gel free polymers, to the polymeric products produced by the process, to powder and liquid coating applications containing the polymeric products made by the process, and to powder and liquid coatings containing such polymers.

BACKGROUND OF THE INVENTION

Continuous processes for the production of polymers are well known in the art. However, many of the processes used to date to produce polymers for industrial use suffer from significant limitations including high cost, significant gelation problems when utilizing epoxy-containing monomers or high levels of acrylic monomers, poor incorporation levels of particular monomers, and an inability to produce polymers that can be utilized in weatherable and non-yellow coating applications.

U.S. Pat. No. 4,414,370, issued to Hamielec et al., discloses a continuous bulk polymerization process for polymerizing vinylic monomers to prepare low molecular weight polymers employing thermal initiation at reaction temperatures from 235° C. to 310° C. and residence times of at least 2 minutes in a continuous stirred reactor zone.

U.S. Pat. No. 4,529,787, issued to Schmidt et al., discloses a continuous bulk polymerization process including an initiator for preparing low molecular weight, uniform polymers from vinylic monomers at short residence times and moderate reaction temperatures to provide high yields of a product suitable for high solids applications.

U.S. Pat. No. 4,546,160, issued to Brand et al., discloses a continuous bulk polymerization process for polymerizing acrylic monomers to prepare low molecular weight, uniform, polymers for use in high solids applications which uses a minor amount of initiator at short residence times and moderate temperatures.

None of the prior art teaches how to overcome the problems related to producing gel free polymers at high temperatures using continuous processes. Typically, significant gel particle formation occurs when continuous, high temperature polymerization reactions are conducted to produce polymers, particularly addition polymers such as epoxylated addition polymers. The gel formation is known to be more severe if both epoxy moieties and other functional moieties, such as hydroxyl groups, are simultaneously present in the reactor.

Moreover, epoxylated addition polymers are generally formed by the polymerization of epoxy-functional monomers together with methacrylate monomers and other selected monomers. Often the epoxy-functional monomers are themselves methacrylate monomers. Conventional high temperature polymerization methodologies have not been able to adequately solve problems encountered when producing such polymers which include low levels of incorporation of the methacrylate monomers into the final polymeric product. There remains a need for continuous high temperature polymerization processes to produce epoxylated addition polymers which overcome these shortcomings of such processes known in the art.

U.S. Pat. No. 5,256,452, issued to McMonigal et al., teaches the production of clear coatings using epoxylated polymers produced via a semi-batch process. These coatings, typically used for automobile finishes, can give a yellowish cast to the colored base coat which they cover. This is particularly a problem when the colored base coat is white. Unfortunately, clear coatings containing these epoxylated polymers produced according to U.S. Pat. No. 5,256,452 demonstrated excess yellowness when applied as either liquid or powder clear coatings over base coatings.

Finally, clear coatings containing the epoxylated polymers produced according to conventional processes have significant problems in addition to the yellowing problem described above. For example, clear coatings containing conventional epoxylated polymers also lack weatherability. When these conventional clear coatings are used in applications which expose them to extreme conditions, such as automobile coatings, they sometimes fail to provide the durability required. A need exists to produce epoxylated polymers for use in clear coatings that overcome the problems associated with conventional epoxylated polymers.

SUMMARY OF THE INVENTION

The present invention relates to a continuous, high temperature polymerization process for preparing a polymeric product, wherein the polymeric product is formed substantially free of gel particles. This is accomplished by utilizing a reactor that is filled to 100% of its usable volume. In one embodiment, the reactor is continuously charged with at least one epoxy-functional acrylic monomer, and optionally at least one non-functional free radical polymerizable monomer(s), such monomers including, but not limited to, non-functional acrylate monomers, non-functional methacrylate monomers, non-functional styrenic monomers and combinations thereof. In another embodiment, the reactor is charged with monomers which comprise at least one epoxy-functional acrylic monomer and at least one hydroxy-functional acrylic monomer, and at least one non-functional free radical polymerizable monomer(s), such monomers including, but not limited to, non-functional acrylate monomers, non-functional methacrylate monomers, non-functional styrenic monomers and combinations thereof. In still another embodiment, the reactor is charged with monomers which comprise at least one carboxylic-acid functional acrylic monomer and optionally non-functional free radical polymerizable monomer(s), such monomers including, but not limited to, non-functional acrylate monomers, non-functional methacrylate monomers, non-functional styrenic monomers and combinations thereof. The reactor in each embodiment is maintained at an effective temperature for an effective period of time to cause polymerization of the monomers to produce a polymeric product from the monomers formed substantially free of gel particles within the reactor. In each embodiment, the reactor may also optionally be charged with at least one free radical polymerization initiator and/or one or more solvents.

The present invention also relates to maximizing the conversion of all monomers in the reactor feed into the polymeric product of the present invention.

The present invention is also drawn to liquid and powder clear and pigmented coatings incorporating polymeric products of the present invention.

These and other aspects of the invention will be apparent from the specification that follows together with the appended claims.

BRIEF DESCRIPTION OF THE DRAWINGS

The preferred exemplary embodiment of the invention will hereinafter be described in conjunction with the appended drawings, wherein like numerals denote like elements and:

FIG. 13 is a schematic diagram of a polymer production line utilizing a reactor that is filled to 100% of its usable volume (liquid full) according to the present invention.

DETAILED DESCRIPTION OF THE INVENTION

Figure 1:
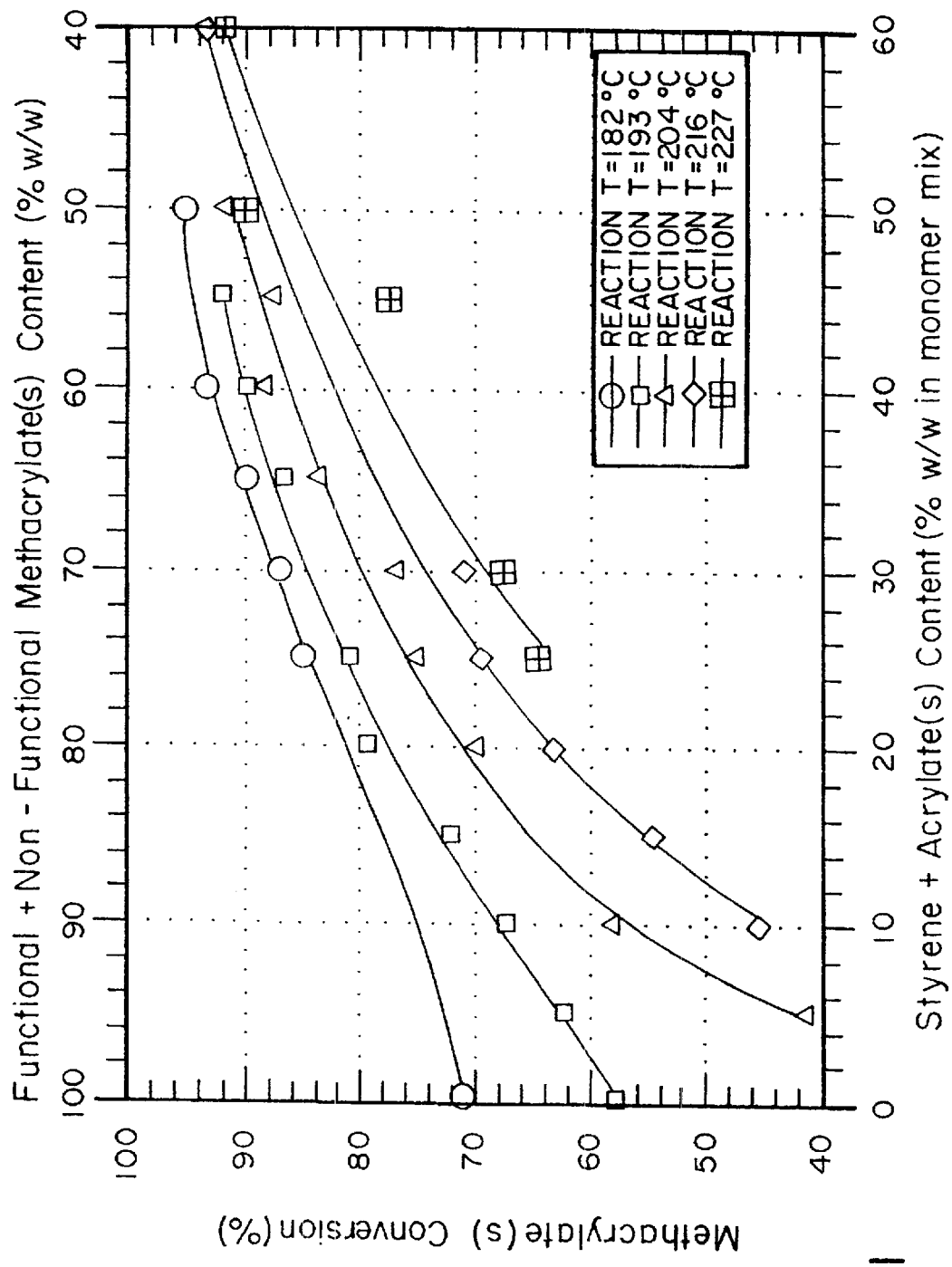
FIG. 1 is a graph illustrating the effect of the increase of functional and non-functional methacrylate monomer conversion as a function of an increase in concentration of non-functional acrylate monomer and non-functional non-α substituted styrenic monomer.

In the present application, the following terms are used consistently throughout, and are defined as follows:

Comparable acrylate free polymeric product—A polymeric product that is produced by the same continuous process of the present invention, and comprises the same monomers in the reactor feed, except no acrylate monomers are present in the reactor feed.

Comparable batch polymeric product—A polymeric product that is produced from the same monomer composition as the polymeric product of the present invention, and differs in that it is produced via a batch or semi-batch process rather than a continuous process as provided for by the present invention.

Functional Group—Any chemical group that could chemically react with an epoxy-functional group, including, but not limited to, hydroxy, carboxylic acid and amino groups.

Lower color—A first clear coating that has a lower Delta b value when measured under the same conditions than a second clear coating is herein defined as having a lower color.

Non-functional (monomer)—A monomer that does not include a cross-linkable functional epoxy group, or any functional group that could chemically react with an epoxy group.

Standard conditions—Standard conditions relates to the conditions at which the Delta b value is measured. In the case of a liquid clear coating, the standard conditions are defined as measuring the Delta b value on a three layer substrate made up of E-coat ED5250, PPG primer FCP6842, and PPG basecoat ODCT6466 oxford white on which a 1.6 mil thick liquid clear coating containing the polymeric product is placed. The liquid clear coating is formulated and produced as described in Example 4 herein. Each substrate with the liquid coating is cured in an electric oven at 140° C. for 30 minutes and examined for color in Delta b yellowness is using a Macbeth Color Eye 7000. Delta b is measured under three separate light conditions D-65, A, and CWF(2) to obtain averaged values. In the case of powder clear coating, the standard conditions are defined as measuring the Delta b value on a three layer substrate made up of E-coat ED5250, PPG primer FCP6842, and PPG basecoat ODCT6466 oxford white on which a 2.0 mil thick powder coating containing the polymeric product is placed. The powder coating containing the polymeric product is prepared at the stoichiometric equivalent between epoxy-functionality from the epoxy-functional acrylic monomer(s) and the acid functionality from the crosslinker used to produce the powder coating. The powder clear coating is formulated and produced as described in Example 3 herein. Each substrate with the powder coating is cured in an electric oven at 140° C. for 30 minutes and examined for color in Delta b yellowness using a Macbeth Color Eye 7000. Delta b is measured under three separate light conditions D-65, A, and CWF(2) to obtain averaged values.

Substantially free of gel particles—The polymerization reaction takes place in such a manner that gel particle formation is avoided during the reaction to any extent which would adversely affect the continuous reaction and/or the resulting polymeric product.

Weatherability—The ability to retain gloss and/or color after exposure to sunlight and/or UV light.

The present invention is directed to a continuous, high temperature polymerization process for preparing polymers that are formed substantially free of gel particles. This is accomplished by utilizing a reactor that is filled to 100% of its usable volume. Any suitable monomers well known in the art may be used. In one embodiment, an addition polymer is formed.

The present invention also includes a continuous, high temperature polymerization process for preparing a free radically polymerized epoxy-functional polymeric product comprising continuously charging into a reactor at least one epoxy-functional acrylic monomer, optionally at least one non-functional free radical polymerizable monomer, and optionally at least one free radical polymerization initiator, such that the reactor is operated under liquid full conditions. In a preferred process, the reactor does not contain any other monomers or compounds which include functional groups other than the epoxy-functional acrylic monomer(s). The monomer mixture is maintained in the reactor at an effective temperature for an effective period of time to cause polymerization of the monomers and produce a polymeric product such that the polymeric product is formed substantially free of gel particles.

In one embodiment of the present invention, the epoxy-functional acrylic monomer(s) are present in the monomer feed in the continuous process in amounts ranging from about 1% to 100% by weight, in another embodiment about 15% to about 60% by weight, based on the total weight of the polymerizable monomers in the feed. In such cases, the non-functional free radical polymerizable monomer(s) may be present in amounts ranging from 0% to about 99% by weight, or in another embodiment in amounts of up to 85% by weight based on the total weight of the polymerizable monomers.

In another embodiment of the present invention, the epoxy-functional and hydroxy-functional acrylic monomer(s) are present in the monomer feed in the continuous process in a combined amount ranging from about 2% to about 76% by weight based on the total weight of the polymerizable monomers in the feed. In such cases, the epoxy-functional monomer(s) may be present in the monomer feed in amounts ranging from about 1% to about 75% by weight, and the hydroxy-functional acrylic monomer(s) will be present in amounts ranging from about 75% to about 1% by weight, based on the total weight of the polymerizable monomers in the feed. In another embodiment, the epoxy-functional and hydroxy-functional acrylic monomer(s) are present in the monomer feed in a combined amount from about 20% to about 60% by weight, with the epoxy-functional acrylic monomers comprising at least 50% by weight of the combined epoxy-functional and hydroxy-functional acrylic monomer(s). When the monomer feed comprises both epoxy-functional and hydroxy-functional acrylic monomer(s), the monomer feed may also comprise from about 25% to about 98% of at least one non-functional free radical polymerizable monomer(s) by weight based on the total weight of polymerizable monomers in the feed.

In still another embodiment of the present invention, the carboxylic acid-functional acrylic monomer(s) are present in the monomer feed in the continuous process in an amount ranging from about 5% to 100% by weight, in another embodiment about 20% to 100% by weight, and in another, embodiment about 22% to about 55% by weight, based on the total weight of the polymerizable monomers in the feed. When the monomer feed comprises carboxylic acid-functional acrylic monomer(s), the monomer feed may also contain from about 95% to 0% of at least one non-functional free radical polymerizable monomer(s) by weight, in another embodiment about 80% to 0% by weight, and in another embodiment about 45% to about 78% by weight, based on the total weight of polymerizable monomers in the feed.

The term "by weight" as used herein is hereby defined as the total weight of the entire class of the particular monomer (s) used, for example, if multiple epoxy-functional acrylic monomers are utilized, the preferred total weight of all such monomers will be from about 15% to about 60% by weight based on the total weight of the polymerizable monomers in the feed. All ranges recited herein include all combinations and subcombinations included with that range's limits; therefore, a range from about "15% to about 60%" would include ranges from about 15% to about 45%, from about 30% to about 47%, etc. A range of "up to 85%" would include up to 80%, up to 50%, up to 24%, etc.

Examples of epoxy-functional acrylic monomers and other acrylic monomers for use in the present invention include both acrylates and methacrylates. Examples of the epoxy-functional acrylic monomers include, but are not limited to, those containing 1,2-epoxy groups such as glycidyl acrylate and glycidyl methacrylate. The preferred epoxy-functional acrylic monomer is glycidyl methacrylate.

The monomer mixture may also include one or more non-functional free radical polymerizable monomers in any combination. These additional non-functional free radical polymerizable monomers are present in total in amounts of up to 99% by weight of the total weight of the monomers present.

Examples of hydroxy-functional acrylic monomers for use in the present invention include both acrylates and methacrylates. Examples of these monomers include, but are not limited to, those containing 2, 3 or 4-hydroxy groups such as 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, 2-hydroxybutyl acrylate, 4-hydroxybutyl acrylate and 2-hydroxybutyl methacrylate, 4-hydroxybutyl methacrylate. When hydroxy-functional acrylic monomers are utilized, the preferred epoxy-functional acrylic monomer is glycidyl methacrylate.

In one embodiment, these free radical polymerizable monomers include other non-functional acrylate monomers and/or non-functional methacrylate monomers. In a preferred embodiment of the present invention, the non-functional acrylate and/or non-functional methacrylate monomers are present in the monomer feed in the continuous process in amounts ranging up to about 99% by weight of the total weight of the monomers. In another preferred embodiment, the non-functional acrylate and/or non-functional methacrylate monomers are present in the monomer feed in the continuous process in amounts ranging up to 85% by weight of the total weight of the monomers. Suitable acrylate and methacrylate monomers include, but are not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. The preferred non-functional acrylate and non-functional methacrylate monomers are butyl acrylate, butyl methacrylate, methyl methacrylate, iso-butyl methacrylate, cyclohexyl acrylate, cyclohexyl methacrylate, isobornyl acrylate, isobornyl methacrylate and combinations thereof.

In preferred processes of the present invention, the monomer feed will comprise at least two different non-functional acrylate or non-functional methacrylate monomers, and in a still more preferred embodiment, the monomer feed for the continuous reaction will comprise at least three different non-functional methacrylate monomers. In still other preferred processes of the present invention, at least two non-functional methacrylate monomers and one non-functional acrylate monomer is fed into the continuous reaction mixture. In still another preferred process of the present invention, the monomer feed will comprise at least one non-functional acrylate and one non-functional methacrylate. In another preferred process of the present invention, the monomer feed consists essentially of epoxy-functional monomers and non-functional styrenic monomers.

In a preferred embodiment, the process of the present invention also comprises one or more free radical polymerization initiators. In another preferred embodiment, the processes of the present invention may be conducted without the presence of any initiators. The initiators suitable for carrying out the process according to the present invention are compounds which decompose thermally into radicals in a first order reaction, although this is not a critical factor. Suitable initiators preferably have half-life periods in the radical decomposition process of about 1 hour at temperatures greater or equal to 90° C. and more preferably 10 hours at temperatures greater or equal to 100° C. Others with about 10 hour half-lives at temperatures significantly lower than 100° C. may also be used. Suitable initiators are, for example, aliphatic azo compounds such as 1-t-amylazo-1-cyanocyclohexane, azo-bis-isobutyronitrile and 1-t-butylazo-cyanocyclohexane, 2,2'-azo-bis-(2-methyl)butyronitrile and peroxides and hydroperoxides, such as t-butylperoctoate, t-butyl perbenzoate, dicumyl peroxide, di-t-butyl peroxide, t-butyl hydroperoxide, cumene hydroperoxide, di-t-amyl peroxide and the like. Additionally, di-peroxide initiators may be used alone or in combination with other initiators. Such di-peroxide initiators include, but are not limited to, 1,4-bis-(t-butyl peroxycarbo) cyclohexane, 1,2-di(t-butyl peroxy)cyclohexane, and 2,5-di (t-butyl peroxy)-3-hexyne, and other similar initiators well known in the, art. The preferred initiators are di-t-butyl peroxide and di-t-amyl peroxide.

The initiator is preferably added with the monomers. The initiators may be added in any appropriate amount, but preferably the total initiators are added in an amount of about 0.0005 to about 0.06 moles initiator(s) per mole of monomers in the feed. For this purpose initiator is either admixed with the monomer feed or added to the process as a separate feed.

The polymeric product of the present invention may optionally include one or more non-functional styrenic monomers as one or more of the other non-functional free radical polymerizable monomers. When present, the styrenic monomers are fed in together with the other monomers in an amount of up to 99% by weight, in one embodiment up to 25% by weight, based on the weight of the total monomer feed. Styrenic monomers for use in the present invention include, but are not limited to, styrene, cc-methylstyrene, p-methylstyrene, t-butylstyrene, o-chlorostyrene, vinyl pyridine, and mixtures of these species preferred styrenic monomers for use in the process include styrene and c-methyl-styrene.

The process of the present invention optionally may additionally include one or more inert solvents in the reactor feed. This solvent may be fed into the reactor together with the monomers, or in a separate feed. The solvent may be any solvent well known in the art that preferably does not react with the epoxy functionality on the epoxy-functional acrylic monomer(s) at the high temperatures of the continuous process described herein. As discussed in more detail below, the proper selection of solvent may decrease the gel particle formation during the continuous, high temperature reaction of the present invention. Such solvents include, but are not limited to, xylene, toluene, ethyl-benzene, Aromatic-i100θ, Aromatic 150θ, Aromatic 200θ(all Aromatics available from Exxon), acetone, methylethyl ketone, methyl amyl ketone, methyl-isobutyl ketone, N-methyl pyrrolidinone, and combinations thereof. When used, the solvents are present in any amount desired, taking into account reactor conditions and monomer feed. In one embodiment, one or more solvents are present in an amount of up to 40% by weight, up to 15% by weight in a preferred embodiment, based on the total weight of the polymerizable monomers.

The process of the present invention also includes a continuous, high temperature liquid full polymerization process for preparing a free radically polymerized epoxy-functional polymeric product comprising continuously charging into a reactor at least one epoxy-functional acrylic monomer, at least one non-functional methacrylate monomer, at least one non-functional acrylate monomer and optionally at least one free radical polymerization initiator. The reactor is then maintained at an effective temperature for an effective period of time to cause polymerization of the monomers and produce a polymeric product. In a preferred embodiment, the reactor is free of all functional groups aside from the epoxy-functional acrylic monomer(s). In another preferred embodiment, the polymeric product incorporates at least 60% by weight of the total functional and non-functional methacrylate monomers based on the total weight of the monomers. In a more preferred embodiment, at least 60% by weight of the total weight of the methacrylate monomers are incorporated into the polymeric product when the process is conducted at a temperature between about 160° C. and about 270° C., preferably up to about 232° C. In another preferred embodiment, the amount of the total weight of the methacrylate monomer incorporated into the polymeric product is increased over the amount of the total weight of methacrylate monomer incorporated into a comparable acrylate free polymeric product.

It has been surprisingly and unexpectedly discovered that by adding a non-functional acrylate monomer this non-functional acrylate monomer maximizes the conversion of the methacrylate monomer(s) into the resulting polymeric product. The resulting polymeric product incorporates a percentage of methacrylate greater than when a comparable acrylate free polymeric product is produced.

The present inventors have discovered that both functional and non-functional methacrylate monomers behave in a specific fashion when incorporated into polymeric products via a high temperature continuous polymerization process. It has been found that every and all methacrylate monomer components in the monomer mix for a continuous polymerization process exhibit a substantial decrease in their extent of copolymerization (i.e. individual conversion) into the polymeric product as the temperature of the reactor increases, rendering lower process yield (i.e. lower process productivity) at higher temperatures. This differs from the behavior of other vinyl monomers, in the continuous polymerization of acrylic and styrene acrylic polymers, within the ranges of this invention.

The introduction of small amounts of a suitable non-functional acrylate monomer and/or nonfunctional non-α substituted styrenic monomers greatly increases the conversion of every and all methacrylate monomer components in the monomer feed mix overcoming this negative feature of high temperature copolymerization of methacrylate containing formulas. The selection of the suitable acrylate monomer to be introduced to the formula for the purpose of expanding the processability in accordance with the present invention has to be in terms of maintaining unchanged the final polymeric product characteristics, particularly Epoxy Equivalent Weight, $T_g$, and Molecular Weight Distribution (hereinafter "MWD") (MWD given by Mn and Mw).

Since process conditions for equal MWD can be easily found in the expanded processability ranges, the equality of Epoxy Equivalent Weight and $T_g$ implies two main things: 1) the non-functional acrylate introduction should not affect the final epoxy-functional acrylic monomer content incorporated into the final polymeric product; and 2) the acrylate may be chosen in such a way that the final $T_g$ of the polymeric product is sufficient for the desired application In. The $T_g$ of the polymeric product is very important in the preparation and performance of both liquid and powder coatings made in accordance with the present invention. $T_g$ is particularly important in powder coating preparation since a decrease in $T_g$ below about 30° C. will cause the polymeric product to exhibit the phenomenon known as cold flow which prevents its use a solid, thus losing its powder character. In liquid coating preparations incorporating polymeric products of the present invention, a variation in $T_g$ may result in substantial differences in rheological behavior.

To satisfy these requirements, the criteria for the suitable non-functional acrylate selection may be based on a copolymer polymeric product $T_g$ prediction model. As an example, the Fox Model that is well known in the art establishes the defined selection criteria by complying with the following equation:

Equation 1

Criteria for Acrylate Introduction for Process Enhancement $$\frac{1}{(Tg_{product} \pm x°c)} =$$

$$\frac{W_{GMA}}{Tg_{GMA}} + \sum_{i=1}^{n} \frac{W_i}{Tg_i} = \frac{W_{GMA}}{Tg_{GMA}} + \sum_{i=1}^{n} \frac{W'_i}{Tg_i} + \frac{W_{Acrylate}}{Tg_{Acrylate}} + \frac{W_{Styrenic}}{Tg_{Styrenic}}$$

In this equation:

$Tg_{product}$+/−x: is the polymeric product desired or current $T_g$+/−a tolerance limit allotted for the inclusion of the additional non-functional acrylate and/or nonfunctional non-α substituted styrenics in the formula.

$W_i$ is the weight fraction of component i in the current product.

$W'_i$ is the weight fraction of component i in the (new) non-functional acrylate and/or nonfunctional non-α substituted styrenic expanded product.

$T_{gi}$ is the $T_g$ of the homopolymer i.

GMA is glycidyl methacrylate, but could be any suitable epoxy-functional acrylic monomer.

Thus, in keeping with the teachings of Equation 1, in formulas for polymeric products of the present invention with low $T_g$ for liquid coatings applications, low $T_g$ non-functional acrylate monomers should be utilized. These non-functional acrylate monomers include, but are not limited to, methyl acrylate, ethyl acrylate, butyl acrylate, hexyl acrylate, 2-ethylhexyl acrylate, octyl acrylate and longer chain aliphatic acrylates, or any other acrylate monomer or, combinations thereof in which a homopolymer(s) of the acrylate(s) exhibits $T_g \leq 30°$ C.

In formulas for polymeric products according to the present invention with high $T_g$ for powder coatings applications, high $T_g$ non-functional acrylate monomers such as cyclohexyl acrylate, iso-bornyl acrylate,i non-functional non-α substituted styrenics and combinations thereof, and any other acrylate monomer(s) which homopolymer(s) exhibits $T_g > 30°$ C. should be preferred.

In both cases the maximum allowable amount of the selected suitable non-functional acrylate monomer(s) and/or non-functional non-α substituted styrenic monomer(s) to be introduced, will be constrained by its compliance to Equation 1. That is, the selection of a given acrylate/styrenic to be introduced fixes its $T_g$ and therefore also fixes its maximum usage before violating the $T_g$ variation tolerance constraint.

In this manner, any non-functional acrylate monomer and/or non-functional non-α substituted styrenic monomer can be introduced to any formula within the range of this invention with the purpose of expanding the processability. However, the larger the gap between the $T_g$ of the non-functional monomer chosen with respect to the $T_g$ of the monomer that it is replacing or the $T_g$ of the target polymeric product, the lower the permissible amount of this monomer will be set by compliance with Equation 1. If the $T_g$ gap is too large, the permissible amount may be so low that no process advantages may be found. This increased conversion of both functional and non-functional methacrylates is shown in the FIG. 1. FIG. 1 illustrates the combined effect of the non-functional non-α substituted styrene and non-functional acrylate(s) content on the averaged conversion of all and every functional and non-functional methacrylate(s) contained in the same reaction mix, as a function of polymerization temperature in the process of this invention.

Any non-functional acrylate monomer and/Or non-functional non-α substituted styrenic monomer having the proper $T_g$ may be used. However, certain acrylate monomers will not only affect the rate of incorporation of the methacrylate monomer(s) into the final product, but will also enhance the performance of the final product in which the resultant polymeric product is used. In the present invention, cyclohexyl acrylate, isobornyl acrylate, or combinations thereof, are preferred for process enhancement not only because of their $T_g$ difference with respect to the typical methacrylate components such as methyl methacrylate, butyl methacrylate, and isobutyl methacrylate, found in the polymeric products utilized in liquid and powder coatings is small thus allowing larger amounts of cyclohexyl acrylate or isobornyl acrylate to be introduced, but also that these amounts can be afforded because these monomers also enhance the product performance inasmuch as it increases the final coating weatherability. Therefore the benefits of these two monomers are twofold, processability enhancement and product performance enhancement.

Although in one embodiment the present invention is directed to reacting non-functional monomers with the epoxy-functional acrylic monomer, other functional monomers may be added to the reaction in such instances. The levels of these other functional monomers that may be added are typically low enough so as not to greatly affect either the level of gel particles within the polymeric product via additional crosslinking or the conversion of the epoxy-functional acrylic monomer into the polymeric product.

In another embodiment of the present invention, it has been surprisingly and unexpectedly discovered that by conducting a continuous reaction in a liquid full reactor, hydroxy-functional acrylic monomers can be reacted with epoxy-functional acrylic monomers simultaneously in the same reaction to produce a polymeric product that is substantially free of gel particles. The levels of these two functional monomers that may be added are typically about 75% or less by combined weight of the total weight of the polymerizable monomer feed, with the balance of the monomer feed comprising non-functional free radical polymerizable monomer(s).

Also, the present invention is directed to reacting carboxylic acid-functional acrylic monomers with non-functional free radical polymerizable monomers in a liquid full reactor under continuous processing conditions, in the general absence of epoxy-functional monomers and other functional monomers. However, small amounts of other functional monomers may also be added to the liquid full reactor under such conditions. The levels of these other functional monomers that may be added are typically low enough so as not to greatly affect either the level of gel particles within the polymeric product via additional crosslinking or the conversion of the carboxylic acid-functional acrylic monomer into the polymeric product.

The continuous high temperature process of the present invention is conducted in the manner well known in the art, and is conducted according to the method embodied in U.S. Pat. No. 4,529,787, issued to Schmidt et al. (hereinafter "Schmidt et al."), except as otherwise noted. Schmidt et al. is hereby incorporated by reference in its entirety. However, it has been surprisingly and unexpectedly discovered that by modifying the continuous process as described by Schmidt et al., several problems previously encountered in the art can be avoided and several additional benefits can be had.

The continuous high temperature process described in Schmidt et al. had previously shown a large tendency to produce gel fouling resulting in product contamination at high temperatures when various functional monomers were used in the reaction feed. The inventors of the present invention have discovered that by modifying the process of Schmidt et al. in a number of respects, the process can be conducted to produce polymeric products that are substantially free of gel particles when utilizing epoxy-functional monomers. Gel particle formation may occur as both (a) gel deposits below the surface of the monomer reactants, (b) gel deposits in the headspace above the surface of the monomer reactants; and (c) throughout the machinery used to conduct the high temperature continuous process. Any of this gel formation may contaminate the final polymeric product.

It has been surprisingly and unexpectedly discovered that a number of steps may be undertaken to significantly reduce gel particle formation in a high temperature continuous process, such that the resulting polymeric product is substantially free of gel particles. These steps may each be used individually, or in any combination. These steps include: (1) reactor pre-cleaning; (2) reaction solvent selection; (3) maximizing epoxy-functional monomer conversion; and (4) liquid full reactor operation.

It has been found that by careful reactor train precleaning, gel particle formation in the production of epoxylated addition polymers can be avoided. It has been found that traces of acid functional compounds in the reactor system which are left behind by previous polymerization products containing functional carboxylic acid groups, monomer contamination, by-products, etc., readily react with the epoxy-functional monomers of the present invention forming di-vinyl species. Small amounts of divinyl monomers in these gelation seeds are well known to produce extensive cross-linking in free radical polymerization which leads to gel particle formations. These divinyl monomers are eliminated as effectively and economically as possible by minimizing all traces of acid from the process. To do so, the reactor is precleaned with a suitable solvent for removing such acid residue, such as N-methyl pyrrolidinone.

It has also been discovered that solvents containing functional groups that react with the epoxy-functional monomers at high temperatures should be avoided. These include all solvents bearing the general formulas, R—OH, R—COOH, R—NH$_2$, and other solvents bearing functional groups. It has been further surprisingly and unexpectedly discovered that solvents which do not have such functional groups, but show by-products or contaminates or residuals of these functional groups from their manufacturing processes, even in trace amounts, may lead to epoxy ring opening and divinyl intermediary formation, which may lead to gel particles. Therefore, such solvents containing contaminates, by-products, etc., may be avoided in the reaction system used in accordance with the present invention. The proper selection of solvent minimizes gel deposits under the liquid surfaces.

It has further been found that monomers feed the gel growth on the free surfaces in the head space of the reactor system via condensation at these surfaces. Because the continuous polymerization of the present invention takes place in a closed system at a high temperature, the polymerization takes place at super atmospheric pressure. At such super atmospheric pressure, the behavior in the vapor phase and the condensate phase forming at the free surfaces in contact with the vapor will obey well known vapor-liquid equilibrium laws. Therefore, the selection of the inert solvent may additionally be based on its vapor pressure relative to the epoxy-functional acrylic monomer(s). A solvent with similar or lower vapor pressure than the epoxy-functional monomer(s) will preferably condense at the free surfaces diluting the other components in the reaction. Alternatively, a solvent with a higher vapor pressure than the epoxy-functional monomer(s) will decrease the mass of these monomers in the vapor phase, thus decreasing their actual amount condensing.

Which of these two conditions is more effective depends upon the particular system being utilized. A combination of solvents, as previously described, may be used to maximize the particular characteristics sought in a given reaction.

Finally, gel particle formation may be further decreased by maximizing the conversion of the epoxy-functional monomer(s) into the polymeric product and/or by using a liquid-full reactor not having a headspace. It has been surprisingly and unexpectedly discovered that the amount and rate of gel formation in the processes of the present invention is directly proportional to the amount of epoxy-functional monomer in the system. Since the gel particle formation at the headspace surfaces within the reaction system requires the vaporization-condensation of the epoxy-functional monomer(s) as previously described, the effect from the epoxy-functional monomer on this system is null when these monomers are incorporated into the polymeric product, as the polymeric product is non-volatile. Therefore, increasing the incorporation of the epoxy-functional monomer(s) into the polymeric product, via either the presence of one or more non-functional acrylate monomers or any other method known in the art, will further decrease gel particle formation. In one embodiment, the liquid full reactor is maintained under a constant pressure above atmospheric pressure. The pressure may be maintained by any means known in the art, including the use of an inert gas such as nitrogen.

The process of the present invention is conducted in a continuous process at high temperatures. In one embodiment, the temperatures range from about 160° C. to about 270° C., preferably about 170° C. to about 250° C., and more preferably from about 170° C. to about 232° C. In another embodiment, the temperature may range from about 175° C. to about 250° C., with the preferred temperature ranging from about 180° C. to about 232° C.

The continuous process of the present invention allows for a short residence time within the reactor. The residence time is generally less than one hour, with a preferred average residence time for the monomers of less than 15 minutes. In another embodiment, the residence time is generally less than 30 minutes, with a preferred average residence time for the monomers of less than 20 minutes.

The process of the present invention may be conducted using any type of reactor or combination of reactors well-known in the art, in a continuous configuration. Such reactors include, but are not limited to, continuous stirred tank reactors ("CSTRs"), tube reactors, loop reactors, extruder reactors, or any reactor or combination of reactors suitable for continuous operation.

In one preferred embodiment, the reaction zone of the continuous bulk polymerization process generally comprises a well mixed CSTR of any type adapted for variable fillage operation of from as low as 10% to as much as 100% of the usable volume thereof for the production of epoxylated polymers. The CSTR generally used in the process may be either horizontal or vertical and should have provision for close control of the temperature therein by any desired means, including control by a cooling jacket, internal cooling coils or other appropriate means well known in the art.

A preferred form of CSTR which has been found suitable for carrying out the process is a tank reactor provided with cooling coils and/or cooling jackets sufficient to remove any heat of polymerization not taken up by raising the temperature of the continuously charged monomer composition so as to maintain a preselected temperature for polymerization therein. Preferably such a CSTR will be provided with at least one, and usually more, agitators to provide a well-mixed reaction zone.

In operating the present continuous polymerization process, flexibility and range of choice may be realized in the types of polymer produced and the production rate of the polymer by proper choice of polymerization reaction conditions. In operation, at least one epoxy-functional acrylic monomer and optionally at least one non-functional free radical polymerizable monomer are continuously charged to the reactor together optionally with at least one suitable free radical polymerization initiator and maintained at the desired temperature. The reactor is generally charged from a stirred feed tank which contains the mixed reactants. However, the monomers, initiator, and any other optional components such as solvents may also be individually charged into the reactor.

After initially filling the reactor to the desired level and initiating the polymerization of the charged reactants, the volume of reactant composition charged into the reactor is adjusted to maintain a desired level of reactant and polymeric product mixture in the reactor. Thereafter, the liquid mixture of polymer and unreacted monomer or monomers is preferably withdrawn from the reactor at a rate to maintain a constant level in the reaction zone. Polymerization conditions are maintained in the reactor to produce a polymer of selected molecular weight and conversion of monomers in such liquid mixture.

As noted, the level that the reactor is filled can vary from as low as 10% to as high as 100% of the usable volume and may be controlled by any desired means, for example, a level controller associated with a valve or pump in the transfer line from the reactor. In a preferred embodiment, the processes of the present invention are performed in a reactor filled to 100% of usable volume, thus further decreasing headspace surfaces and further decreasing the formation of gel particles. Such reactors that are filled to 100% of the usable volume do not have a head space above the reactants, and are liquid full reactors.

Any desired means of controlling the temperature within the reactor may be employed. It is preferred that the temperature be controlled by circulation of a cooling fluid, such as oil, through internal cooling coils and/or reactor circulation jackets in reactors so equipped. Generally, the entry of relatively cool reactants serves to remove the greatest proportion of the heat of polymerization released, and the internal cooling coils serve to remove the remainder so as to maintain the temperature of the reaction mixture at a preselected value.

After reaction, the resulting mixture is typically subjected to separation and product recovery. Unreacted monomer is preferably recycled to the reactor or the monomer feed. During the separation step, volatile components, such as solvent, unreacted monomer and other by-products are vaporized and recycled, where appropriate. For this step, conventional equipment is readily available, such as a thin film evaporator, falling strand evaporator or any appropriate devolatization equipment.

Figure 2:
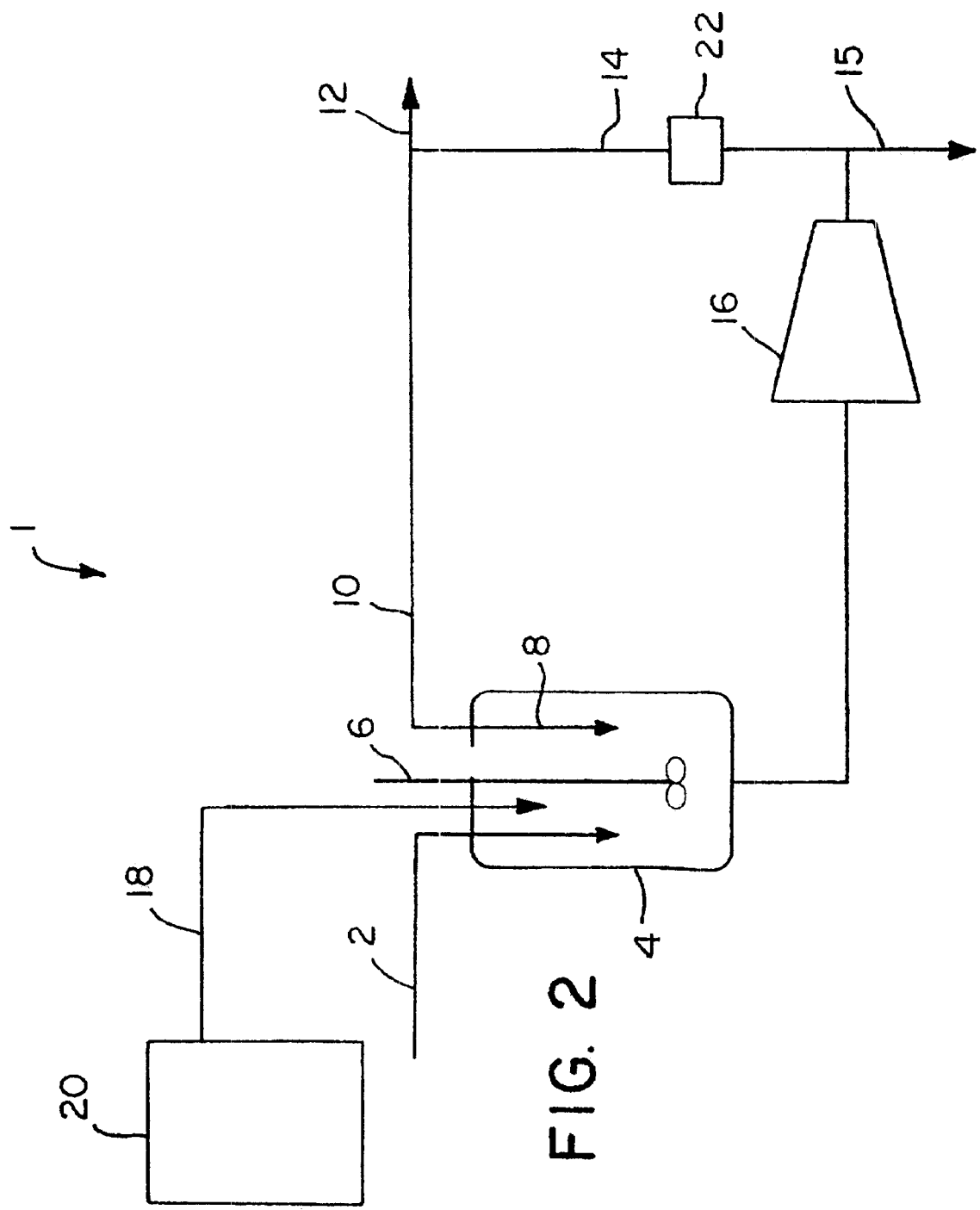
FIG. 2 is a schematic diagram of a polymer production line of the present invention.

One non-limiting methodology of conducting the present process according to the present invention will be described with respect to FIG. 2. FIG. 2 is a schematic diagram of a portion of an exemplary polymer process line 1 using a CSTR. Prior to use, CSTR 4 is precleaned with N-methyl pyrrolidinone. Fresh monomer feed line 18 from fresh feed tank 20 conveys the monomer or monomers of the present invention, together with the free radical polymerization initiator and any optional solvent, into CSTR 4 having agitator 6. Optionally, initiator and/or any other reaction components such as solvent may be fed from 2 into CSTR 4. CSTR 4 provides the proper choice of reaction conditions for obtaining the desired types of polymers. The polymeric product of the reaction is then fed from CSTR 4 to devolatizer 16 for devolatization. The polymer product is fed by way of conduit 15 for additional processing, or as a final product as desired. Condensed distillate from 22 is fed by way of conduits 14 and 10 to recycle feed 8 back into CSTR 4 and/or purged by way of purge 12 as desired.

Although CSTR 4 is depicted as a CSTR, reactor 4 also includes other reactor configurations capable of continuous processes. Thus, reactor 4 may also be a tube reactor, a loop reactor, extruder, or any reactor or combination of reactors capable of continuous operation. CSTR 4 may further include a secondary reactor and/or a finishing reactor.

In many industrial applications, a colored or pigmented base coating is applied to an object, and to protect the colored base coating, a clear coating composition is applied over the base coat. These color-plus-clear coating systems are becoming increasingly popular as original finishes for many applications, most notably in the use of finishes for automobiles. The color-plus-clear systems have outstanding gloss and distinctness of image, and the clear topcoat is particularly important for these properties.

It is important for the clear coating to have several properties. One of these properties is weatherability. Clear coatings used in automobile finishes are constantly exposed to extreme conditions such as rain, snow, dirt and sunlight. In order for a clear coating to be used in automobile finish applications, the clear coat must be weatherable so that the colored base coat is protected.

Further, clear coatings must not affect the visual perception of the colored base coat to which they are applied. A typical problem with clear coatings containing epoxylated polymeric products known in the art is that such coatings impart a yellow tint that is visible to the naked eye when applied over a base coat. This yellowness is generally more problematic when the clear coating is applied to a white base coat.

The polymeric products of the present invention have a wide range of industrial uses, most notably, in pigmented and clear coatings, of both liquid and powder design. It has been surprisingly and unexpectedly discovered that such coatings containing the polymeric products according to the present invention exhibit improved weatherability in clear and pigmented coatings, and lower color in clear coatings than similar coatings which comprises comparable acrylate free polymeric products and/or comparable batch polymeric products, as further described in the following examples. In a preferred embodiment clear coatings containing polymeric products of the present invention demonstrate a decrease in Delta b value of 0.5 or greater when compared to similar clear coatings containing comparable acrylate free polymeric products and/or comparable batch polymeric products.

Powder coatings are well known in the art, and those of the present invention are generally prepared in accordance with those methods. Generally, powder coatings of the present invention comprise one or more polymeric products of the present invention in amounts of about 45% to about 85% by weight, one or more crosslinking agents in amounts of about 15% to about 40% by weight, one or more catalysts in amounts of about 0.1% to about 3.0% by weight, and one or more flow modifying agents in amounts of about 0.5% to about 2.0% by weight. The powder coatings of the present invention also may optionally include one or more degassing agents in amounts of about 0.1% to about 1.5% by weight, one or more antioxidants in amounts of about 0.1% to about 3.0% by weight and/or one or more UV stabilizers in amounts of about 0.5% to about 3.0% by weight.

The powder and liquid coatings are created by any methods well known in the art, for example, as described in U.S. Pat. No. 5,256,452, the entire disclosure of which is hereby incorporated by reference.

Crosslinking agents suitable for use in the powder coatings are those well known in the art which include, but are not limited to, difunctional acids and anhydrides derived from such acids. The preferred crosslinking agent is dodecyldicarboxylic acid.

Catalysts suitable for use in the powder coatings are those well known in the art which include, but are not limited to, inorganic alkaline salts which include tetrabutyl ammonium acetate, tetrabutyl ammonium hydroxide; phosphonium compounds such as ethyltriphenylphosphonium acetate, tetrabutyl-phosphonium bromide; organometallic salts such as stannous octoate, zirconium ocotate; and other organic compounds including tertiary amines, such as N,N-dimethyldodecylamine, dimethylaniline, secondary amines, such as piperidine, and phosphines such as triphenyl phosphine. The preferred catalysts are tertiary amines such as Armeen DM-12Dθ, a N'N-dimethyl amine catalyst available from AKZO Chemical.

Flow modifying agents suitable for use in the powder coatings are those well known in the art which include, but are not limited to, polyacrylates such as poly(butylacrylate), poly(ethylhexylacrylate) and mixtures thereof; and polyamides. Preferred flow modifying agents are polyacrylates.

Degassing agents suitable for use in the powder coatings are those well known in the art which include benzoin which is the preferred degassing agent.

UV stabilizers suitable for use in the powder coatings are those well known in the art which include, but are not limited to hindered amines and benzotriazoles. Preferred UV stabilizers are benzotriazoles.

Antioxidants suitable for use in the powder coatings are those well known in the art which include, but are not limited to, hindered phenolics.

In one embodiment, the powder coating composition comprises a polymeric product consisting essentially of about 1% to 100% by weight at least one epoxy-functional acrylic monomer based on the total weight of the monomers, optionally up to 99% by weight of at least one free radical polymerizable monomer, such monomers including, but not limited to, non-functional acrylate monomers, non-functional methacrylate monomers, non-functional styrenic monomers and combinations thereof, based on the total weight of the monomers, such that the monomers are polymerized into the polymeric product such that the polymeric product in one embodiment comprises a monomer content of epoxy-functional acrylic monomer(s) of at least about 40%. The powder coating also comprises other materials sufficient to form a powder coating when combined with the polymeric product. These other materials preferably include at least one crosslinking agent, at least one catalyst, and at least one flow modifying agent to form the powder coating. The powder coating composition exhibits a Delta b value of 1.2 or less at standard conditions, more preferably, exhibiting a Delta b value of 1.05 or less at standard conditions, when the powder coating is a clear coating.

In another embodiment, powder coatings according to the present invention comprise a polymeric product, the polymeric product consisting essentially of about 15% to about 60% by weight at least one epoxy-functional acrylic monomer based on the total weight of the monomers, up to 85% by weight of at least one non-functional acrylate or non-functional methacrylate monomer based on the total weight of the monomers, 0 to about 25% by weight of at least one non-functional styrenic monomer based on the total weight of the monomers, such that the monomers are polymerized into the polymeric product. The powder coating comprises one or more polymeric products in amounts of about 45% to about 85% by weight, one or more crosslinking agents in amounts of about 15% to about 40% by weight, one or more catalysts in amounts of about 0.1% to about 3.0% by weight, and one or more flow modifying agents in amounts of about 0.5% to about 2.0% by weight. The powder coating composition exhibits a Delta b value of 1.2 or less at standard conditions, more preferably a Delta b value of 1.05 or less at standard conditions, when the powder coating is a clear coating.

Similarly, liquid coatings are well known in the art and those of the present invention are generally prepared in accordance with such methods.

In one embodiment, a liquid coating composition of the present invention comprises a polymeric product consisting essentially of about 1% to 100% by weight of at least one epoxy-functional acrylic monomer based on the total weight of the monomers, up to 99% by weight of at least one non-functional free radical polymerizable monomer, such monomers including, but not limited to, non-functional acrylate monomers, non-functional methacrylate monomers, non-functional styrenic monomers and combinations thereof, based on the total weight of the monomers, such that the monomers are polymerized into the polymeric product, such that the polymeric product in one embodiment comprises a monomer content of epoxy-functional acrylic monomer(s) of at least about 40%, mixing the polymeric product with other materials sufficient to form a liquid coating. The liquid coating clear composition exhibits a Delta b value of 1.2 or less at standard conditions, when the liquid coating is a clear coating. In a preferred embodiment, the other materials used to form the liquid coating include at least one solvent, at least one crosslinking agent, at least one curing agent, and at least one catalyst.

The liquid coatings of the present invention also may optionally include one or more flow modifying agents, one or more antioxidants and/or one or more UV stabilizers in amounts as described above in connection with the powder coatings. Similar compounds may be utilized in preparing the liquid coatings as in the powder coatings. The curing agents and solvents are those taught in U.S. Pat. No. 5,256,452 which is hereby incorporated by reference.

In another preferred embodiment, liquid coatings according to the present invention comprise a polymeric product, the polymeric product consisting essentially of about 15% to about 60% by weight at least one epoxy-functional acrylic monomer based on the total weight of the monomers, up to 85% by weight of at least one non-functional acrylate or non-functional methacrylate monomer based on the total weight of the monomers, 0 to about 25% by weight of at least one non-functional styrenic monomer based on the total weight of the monomers, such that the monomers are polymerized into the polymeric product. The liquid coating comprises the polymeric product in amounts of 45% to 85% by weight, and further comprises about 15% to about 40% by weight of one or more crosslinking agents, about 0.1% to about 3.0% by weight of one or more catalysts, up to about 40% by weight of one or more curing agents and about 25% to about 60% by weight of one or more solvents. The liquid coating composition exhibits a Delta b value of 1.2 or less at standard conditions, when the liquid coating is a clear coating.

The invention will be further described by reference to the following examples which are presented for the purpose of illustration only and are not intended to limit the scope of the invention. Unless otherwise indicated, all parts are by weight.

EXAMPLES

Example 1

Preparation of an Epoxylated Polymeric Product with Increased Methacrylate Incorporation and Comparison to Comparable Batch Polymeric Product A reaction mixture of 27% glycidyl methacrylate, 18% styrene (St.), 22.5% methyl methacrylate, 22.5% cyclohexyl acrylate (CHA), 9.5% xylene and 0.5% di-tertiary butyl peroxide (monomer ratio =30% glycidyl methacrylate, 20% styrene, 25% methyl methacrylate, and 25% cyclohexyl acrylate) was continuously supplied to a reactor process similar to that described in FIG. 2 comprising a 10 gallon CSTR maintained at a constant temperature. Reaction zone mass and feed mass flow rate were controlled to provide a constant average residence time within the 10 to 15 minute range in the CSTR. The experiments were conducted for a minimum of 30–40 residence times. The reaction temperature of the CSTR was maintained constant at different settings within the range of 175°–232° C. The reaction product was continuously pumped to a devolatization zone, and the polymeric product from the devolatization zone was continuously collected and later analyzed for molecular weight averages (Mn and Mw) and mass balance composition from which its epoxy equivalent weight was computed. The resulting polymeric product was substantially free of gel particles.

For comparison purposes, an epoxy acrylic resin bearing a similar feed monomer ratio was produced in the same reactor zone employing a semi-batch process similar to that described in U.S. Pat. No. 5,256,452. At the end of the process, the reaction product was pumped to a devolatization zone. The polymer product from the devolatization zone was collected and later analyzed for molecular weight averages (Mn and Mw), and mass balance composition from which its epoxy equivalent weight was computed.

The comparative synthesis results are shown in Table 1. As detailed in Table 1, the polymeric product of the present invention has similar epoxy equivalent weight and similar molecular weight averages than the comparable batch polymeric product.

TABLE 1

| Polymerization Process | Semi-Batch (U.S. Pat. No. 5,256,452) Comparative Example 1 | Present Invention (Continuous Process) Example 1 |
|---|---|---|
| Monomer Mix (% w/w) | | |
| Glycidyl methacrylate | 30 | 30 |
| Styrene | 20 | 20 |
| Methyl methacrylate | 25 | 25 |
| Cyclohexyl acrylate | 25 | 25 |
| Other Ingredients (% w/w) | | |
| Xylene (% on total mix) | 30 | 9.5 |
| DTBP (% on total mix) | — | 0.5 |
| 2,2'-azo-bis-(2-methyl)butyronitrile (% on monomers) | 4.8 | — |
| TBP (% on monomers) | 1.7 | — |
| Reaction Conditions | | |
| Reaction Temperature (° C.) | 138 | 207 |
| Residence Time (minutes) | 420* | 12 |
| Product Characteristics | | |
| Mn | 2,346 | 2,173 |
| Mw | 5,633 | 5,133 |
| Epoxy equivalent weight | 475 | 490 |

*total reaction time; DTBP = di-tertiary butyl peroxide; TBP = tertiary butyl perbenzoate.

Example 2

Preparation of an Epoxylated Polymeric Product Via Continuous Process and Comparison to Comparable Batch Polymeric Product A reaction mixture of 40.5% glycidyl methacrylate, 9% styrene, 40.5% methyl methacrylate, 9.25% xylene and 0.75% di-tertiary butyl peroxide (monomer ratio =45% glycidyl methacrylate, 10% styrene, and 45% methyl methacrylate) was continuously supplied to a reactor process similar to that described in Example 1. The reaction zone mass and feed flow rate were controlled to provide an average residence time of 12 minutes in the CSTR. The temperature of the CSTR was maintained constant at different settings within the range of 193° C. to 210° C. The reaction product was continuously devolatized, collected, and analyzed as described in Example 1. The resulting polymeric product was substantially free of gel particles.

For comparison purposes, a reaction mixture bearing the same monomer ratio (45% glycidyl methacrylate, 10% styrene, and 45% methyl methacrylate) was polymerized in the same CSTR, following a semi-batch procedure similar to that described in U.S. Pat. No. 5,256,452. The reaction product was devolatized, collected, and analyzed as described in Example 1.

The comparative synthesis results are shown in Table 2. As detailed in Table 2, the polymeric product of the present invention has similar epoxy equivalent weight and similar molecular weight averages than the comparable batch polymeric product.

TABLE 2

| Polymerization Process | Semi-Batch (U.S. Pat. No. 5,256,452) | Present Invention (Continuous Process) |
|---|---|---|
| Monomer Mix (% w/w) | | |
| Glycidyl methacrylate | 45 | 45 |
| Styrene | 10 | 10 |
| Methyl methacrylate | 45 | 45 |
| Other Ingredients (% w/w) | | |
| Xylene (% on total mix) | 30 | 9.25 |
| DTBP (% on monomers) | — | 0.75 |
| 2,2'-azo-bis-(2-methyl) butyronitrile (% on monomers) | 4.8 | — |
| TBP (% on monomers) | 1.7 | — |
| Reaction Conditions | | |
| Reaction Temperature (° C.) | 138 | 207 |
| Residence Time (minutes) | 420* | 12 |
| Product Characteristics | | |
| Mn | 2,277 | 2,024 |
| Mw | 5,140 | 5,672 |
| Epoxy equivalent weight | 317 | 337 |

*total reaction time; DTBP = di-tertiary butyl peroxide; TBP = tertiary butyl perbenzoate.

Example 3

Powder Coatings Applications

Glycidyl methacrylate powder clearcoats from each epoxylated polymeric product prepared in Examples 1 and 2 were prepared at the stoichiometric equivalent between epoxy-functionality from glycidyl methacrylate and acid functionality from dodecyldicarboxylic acid (DDDA) crosslinker.

The powder clearcoats were made by premixing together the following ingredients in a Henschel premixer, then extruding with a Buss extruder at 60–90° C. at a speed of 238 rpm, and finally grinding with a 0.2 inch screen on a Bantam mill with nitrogen cooling. The ground powders were sieved at 200 mesh prior to electrostatic application to several different substrates. The clearcoat ingredients are shown below in Table 3.

TABLE 3

| Raw materials | A (1/1) | C (1/1) | E (1/1) | G (1/1) |
|---|---|---|---|---|
| Comparative Example 2[1] | 1027.52 | — | — | — |
| Example 2[2] | — | 1027.52 | — | — |
| Comparative Example 1[3] | — | — | 1127.72 | — |
| Example 1[4] | — | — | — | 1127.72 |
| DDDA | 373.85 | 373.85 | 373.85 | 373.85 |
| Armeen DM-12D | 15.07 | 15.07 | 15.07 | 15.07 |
| Modaflow III[5] | 18.84 | 18.84 | 18.84 | 18.84 |
| Benzoin | 7.53 | 7.53 | 7.53 | 7.53 |
| Tinuvin 900[6] | 27.90 | 27.90 | 27.90 | 27.90 |
| Tinuvin 144[7] | 10.45 | 10.45 | 10.45 | 10.45 |
| Irganox 1010[8] | 18.84 | 18.84 | 18.84 | 18.84 |

[1] Comparable batch polymeric product from the semi-batch process with EEW of 317
[2] Epoxylated polymeric product of the present invention from the continuous process with EEW of 337
[3] Comparable batch polymeric product from the semi-batch process with EEW of 475
[4] Epoxylated polymeric product of the present invention from the continuous process with EEW of 490
[5] a polyacrylate
[6] UV light stabilizer available from Ciba Geigy Corporation
[7] benzotriazole UV light stabilizer available from Ciba Geigy Corporation
[8] a hindered phenol Three different substrates commercially available from ACT Laboratories, Inc.(Hillsdale, Mich.) were used for the investigation of powder clearcoats color. They are all composed of the following three layers commonly required for automotive substrate: E-coat, primer, and white basecoat.

SUBSTRATE 52 is ACT-APR-36752 having E-coat ED5250, PPG primer FCP6842, and PPG basecoat ODCT6466 oxford white.

SUBSTRATE 54 is ACT-APR-36754 having E-coat CORMAX EP, DuPont primer 768DM730, and PPG basecoat 692DM640 oxford white.

SUBSTRATE 55 is ACT-APR-36755 having E-coat U32AD250, PPG primer FCP614, and BASF basecoat E86WE640W bright white.

Figure 3:
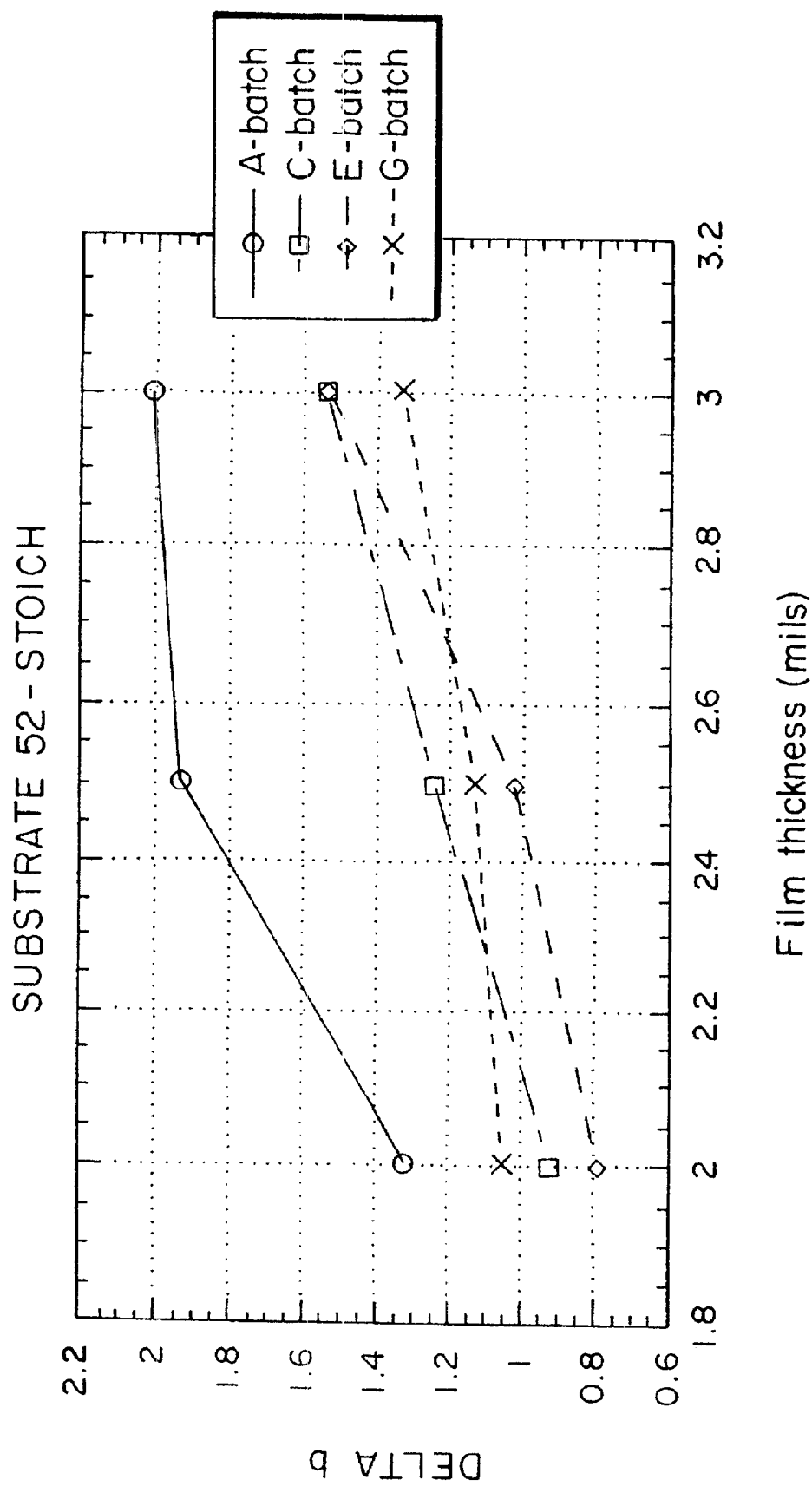
FIG. 3 is a graph illustrating the decrease in yellowness of clear powder coatings formulated with polymeric products of the present, invention when compared to clear powder coatings formulated with comparable batch polymeric products.
Figure 4:
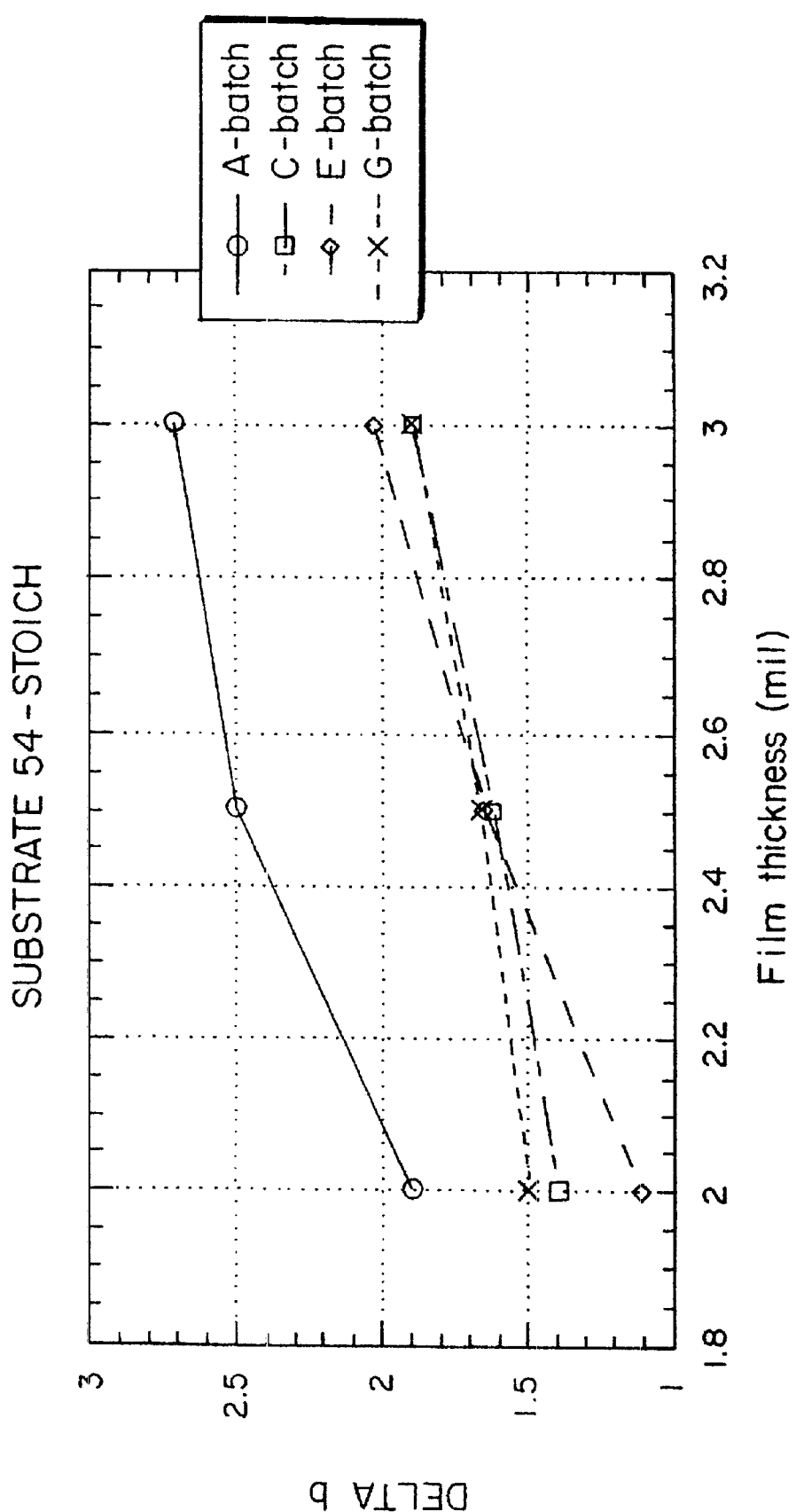
FIG. 4 is a graph illustrating the decrease in yellowness of clear powder coatings formulated with polymeric products of the present invention when compared to clear powder coatings formulated with comparable batch polymeric products.
Figure 5:
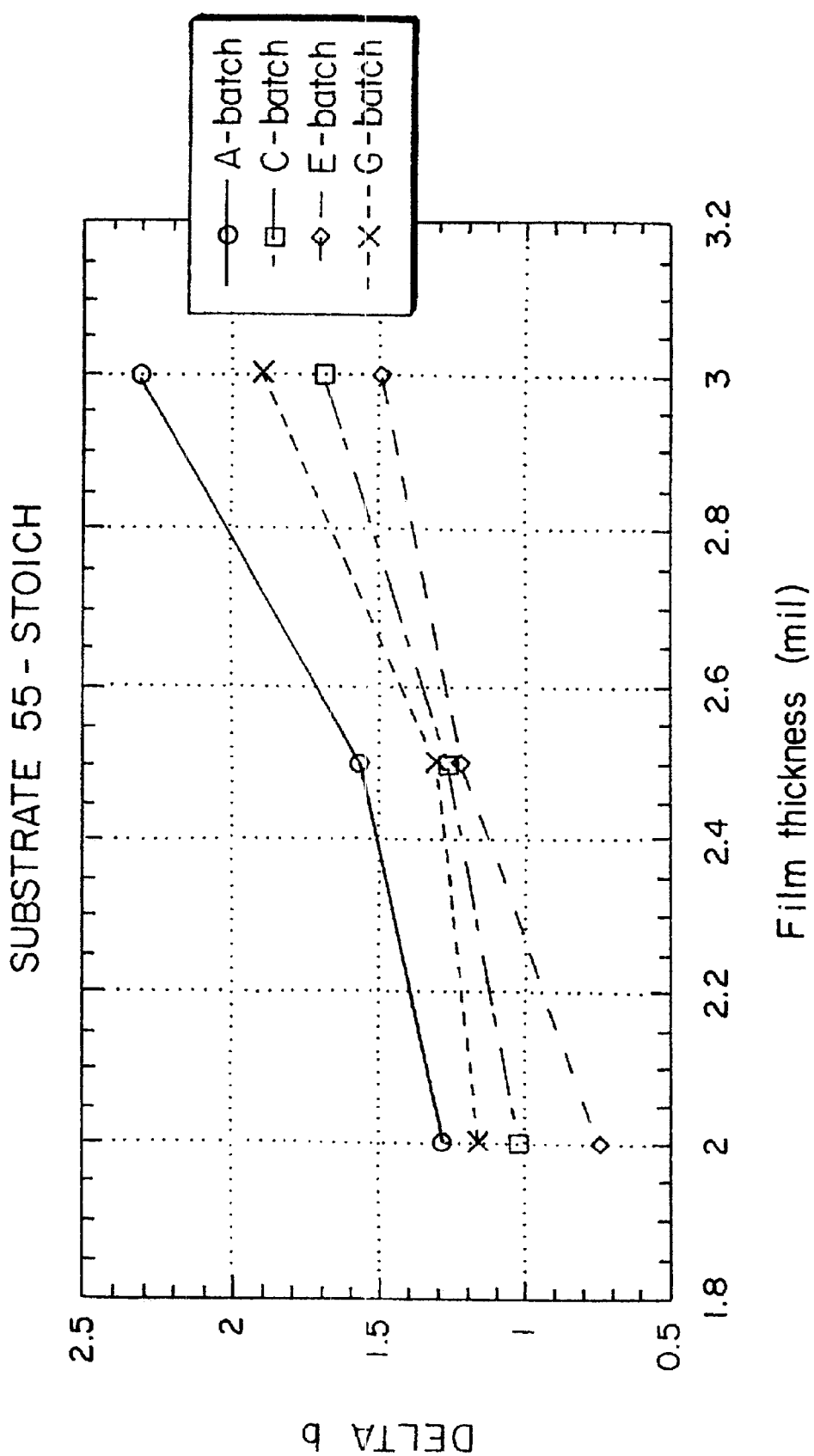
FIG. 5 is a graph illustrating the decrease in yellowness of clear powder coatings formulated with polymeric products of the present invention when compared to clear powder coatings formulated with comparable batch polymeric products.

Each powder coating was applied to each substrate at three different film thickness: 2.0, 2.5, and 3.0 mils. After being cured in an electric oven at 140° C. for 30 min., each panel was examined for color in Delta b yellowness using a Macbeth Color Eye 7000 (GretagMachbeth, New Windsor, N.Y.). Delta b was measured under three separate light conditions: D-65, A, and CWF(2) to obtain the averaged values. Plots between yellowness in Delta b values for each polymeric product in three different film thicknesses for each substrate are shown in FIGS. 3–5. As FIGS. 3–5 indicate, powder clearcoats produced with the polymeric products produced according to the present invention exhibited significantly less yellowness as exhibited by lower Delta b values as compared to powder clearcoats produced with the comparable batch polymeric products, thereby producing a color advantage.

Example 4

Liquid Coatings Applications

Clear film-forming compositions for liquid coating applications were prepared according to U.S. Pat. No. 5,256,452, as shown below in Table 4.

TABLE 4

| Raw materials | A | B |
|---|---|---|
| Comparative Example 2[1] | 98.47 | — |
| Example 2[2] | — | 98.47 |
| Polybutylacrylate[3] | 0.40 | 0.40 |
| Ethyl 3-ethoxypropionate | 45.20 | 45.20 |
| Di-TMP/methylhexahydrophthalic anhydride half ester[4] | 58.83 | 58.83 |
| ARMEEN DM-12D®[5] | 2.00 | 2.00 |
| Tinuvin 292®[6] | 0.40 | 0.40 |
| Tinuvin 328®[7] | 3.00 | 3.00 |

[1]Comparable batch polymeric production from the semi-batch process with EEW of 317
[2]Epoxylated polymeric product of the present invention from the continuous process with EEW of 327
[3]Flow control agent
[4]Crosslinking agent prepared as described in U.S. Pat. No. 5,256,452
[5]N,N-dimethyldodecyl amine catalyst
[6]Substituted benzotriazole UV light stabilizer
[7]Substituted benzotriazole UV light stabilizer All raw materials were mixed at low speed until all of the Tinuvin 328 was dissolved. The mixture was allowed to set for 30 min. Prior to application.

The same three substrates used in evaluating the powder coatings application were used for liquid work. Each clear film-forming composition was applied in multiple layers at 1.5 mils film thickness wet for each layer, until the desired film thickness was achieved. The panel was then allowed to flash at 75° C. for 15 in, and baked at 135° C. for 30 min. Liquid coatings at three different dry film thickness were investigated: 1.60, 2.00, and 2.50 mils.

Figure 6:
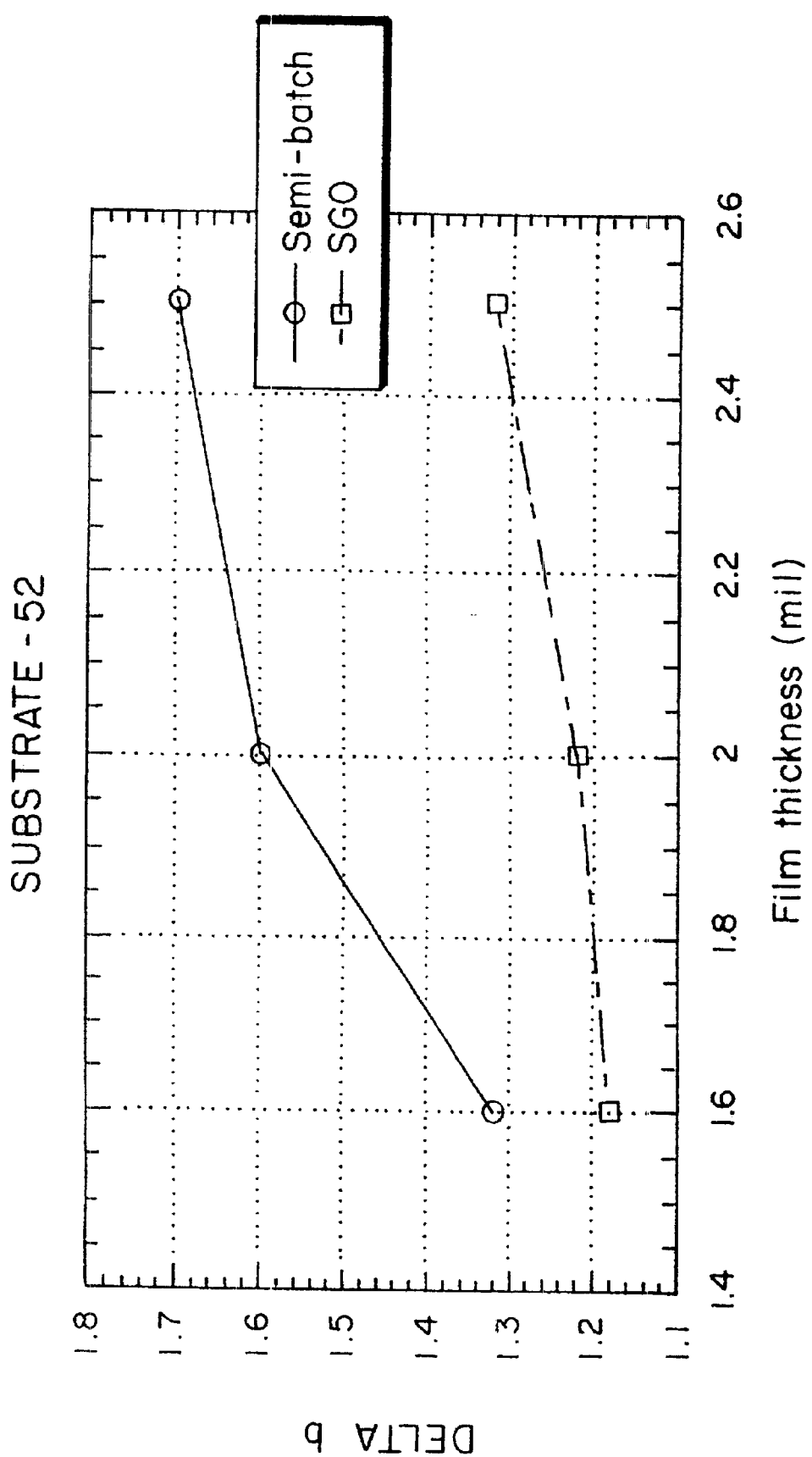
FIG. 6 is a graph illustrating the decrease in yellowness of clear liquid coatings formulated with polymeric products of the present invention when compared to clear liquid coatings formulated with comparable batch polymeric products.
Figure 8:
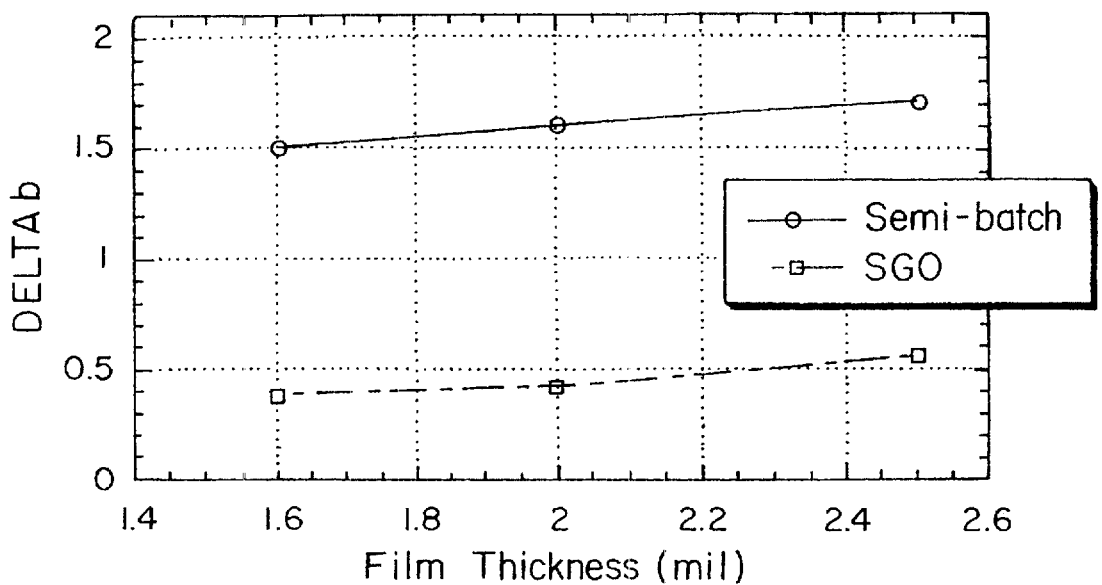
FIG. 8 is a graph illustrating the decrease in yellowness of clear liquid coatings formulated with polymeric products of the present invention when compared to clear liquid coatings formulated with comparable batch polymeric products.
Figure 7:
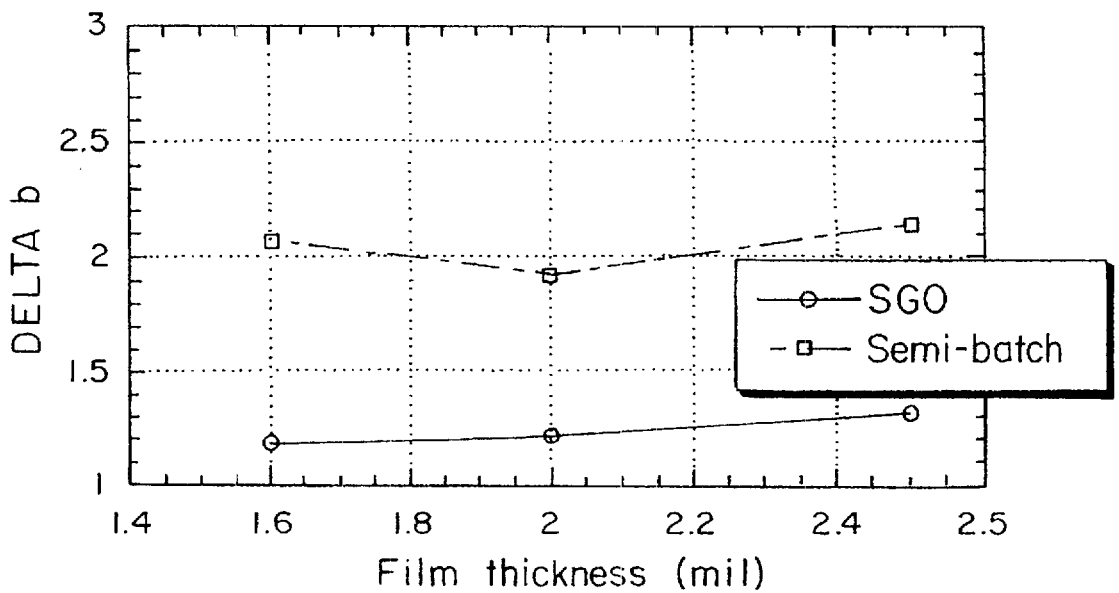
FIG. 7 is a graph illustrating the decrease in yellowness of clear liquid coatings formulated with polymeric products of the present invention when compared to clear liquid coatings formulated with comparable batch polymeric products.

The color of each baked panel was examined in Delta b value using a Macbeth 7000 Color Eye as described in powder coatings applications. The results are shown in FIGS. 6–8. The same color advantage found for powder clear coatings applications was also observed in liquid clear coatings applications. However, the low color advantage, demonstrated by the lower Delta b value, was more dramatic for liquid coatings applications.

Example 5

Preparation of an Epoxylated Polymeric Product Via Continuous Process and Comparison to Comparable Batch Polymeric Product A reaction mixture of 36% glycidyl methacrylate, 15.3% styrene, 18% methyl methacrylate, 11.7% butyl acrylate, 9% butyl methacrylate, and the balance comprised by xylene in the range of 9.7 to 9.0% and di-tertiary butyl peroxide in the range of 0.3 to 1.0% (monomer ratio =40% glycidyl methacrylate, 17% styrene, 20% methyl methacrylate, 13% butyl acrylate, and 10% butyl methacrylate) was continuously supplied to a CSTR similar to that described in Example 1. The CSTR average residence time was controlled at 12 minutes in the agitated reaction zone. The temperature of the CSTR was maintained constant at different settings within the range of 188° C. to 218° C. depending on the percentage of di-tertiary butyl peroxide used. The reaction product was continuously devolatized, collected, and analyzed as described in Example 1. The resulting polymeric product was substantially free of gel particles.

For comparison purposes, a reaction mixture bearing the same monomer ratio (40% glycidyl methacrylate, 17% styrene, 20% methyl methacrylate, 13% butyl acrylate, and 10% butyl methacrylate) was polymerized in the same agitated reactor zone, following a semi-batch procedure similar to that described in U.S. Pat. No. 5,256,452. The reaction product was devolatized, collected, and analyzed as described in Example 1.

Comparative synthesis results are shown in Table 5 below:

TABLE 5

| Polymerization Process | Semi-Batch U.S. Pat. No. 5,256,452 | Present Invention (Continuous Process) | | | |
|---|---|---|---|---|---|
| Monomer Mix (% w/w) | | | | | |
| Glycidyl methacrylate | 40 | 40 | 40 | 40 | 40 |
| Styrene | 17 | 17 | 17 | 17 | 17 |
| Methyl methacrylate | 20 | 20 | 20 | 20 | 20 |
| Butyl acrylate | 13 | 13 | 13 | 13 | 13 |
| Butyl methacrylate | 10 | 10 | 10 | 10 | 10 |
| Other Ingredients (% w/w) | | | | | |
| Xylene (% on total mix) | 30 | 9.0 | 9.25 | 9.5 | 9.7 |
| DTBP (% on total mix) | — | 1.0 | 0.75 | 0.5 | 0.3 |
| 2,2'-azo-bis-(2-methyl) butyronitrile (% on monomers) | 4.8 | — | — | — | — |
| TBP (% on monomers) | 1.7 | — | — | — | — |
| Reaction Conditions | | | | | |
| Reaction Temperature (° C.) | 138 | 188 | 188 | 204 | 216 |
| Residence Time (minutes) | 420* | 12 | 12 | 12 | 12 |
| Product Characteristics | | | | | |
| Mn | 2,298 | 2,686 | 2,936 | 2,360 | 2,134 |
| Mw | 5,563 | 7,530 | 8,465 | 5,602 | 4,866 |
| Epoxy equivalent weight | 356 | 365 | 364 | 372 | 375 |

*total reaction time; DTBP = di-tertiary butyl peroxide; TBP = tertiary butyl perbenzoate.

Example 6

Preparation of an Epoxylated Polymeric Product Via Continuous Process and Comparison to Comparable Batch Polymeric Product A reaction mixture of 27% glycidyl methacrylate, 18% styrene, 40.5% methyl methacrylate, 4.5% butyl acrylate, and the balance comprised by xylene in the range of 9.7 to 9.0% and di-tertiary butyl peroxide in the range of 0.3 to 1.0% (monomer ratio =30% glycidyl methacrylate, 20% styrene, 45% methyl methacrylate, and 5% butyl acrylate) was continuously supplied to a reactor process similar to that described in Example 1. The reaction zone average residence time was controlled at 12 minutes in the agitated reaction zone. The temperature of the agitated reaction zone was maintained constant at different settings within the range of 1 98° C. to 218° C., depending on the percentage of di-tertiary butyl peroxide used. The reaction product was continuously devolatized, collected, and analyzed as described in Example 1. The resulting polymeric product was substantially free of gel particles.

For comparison purposes, a reaction mixture bearing the same monomer ratio (30% glycidyl methacrylate, 20% styrene, 45% methyl methacrylate, and 5% butyl acrylate) was polymerized in the same agitated reactor zone, following a semi-batch procedure similar to that described in U.S. Pat. No. 5,256,452. The reaction product was devolatized, collected, and analyzed as described in Example 1.

The results are described in Table 6.

TABLE 6

| Polymerization Process | Semi-Batch (U.S. Pat. No. 5,256,452) | Present Invention (Continuous Process) | | |
|---|---|---|---|---|
| Monomer Mix (% w/w) | | | | |
| Glycidyl methacrylate | 30 | 30 | 30 | 30 |
| Styrene | 20 | 20 | 20 | 20 |
| Methyl methacrylate | 45 | 45 | 45 | 45 |
| Butyl acrylate | 5 | 5 | 5 | 5 |
| Other Ingredients (% w/w) | | | | |
| Xylene (% on total mix) | 30 | 9.3 | 9.5 | 9.7 |
| DTBP (% on total mix) | — | 0.7 | 0.5 | 0.3 |
| 2,2'-azo-bis-(2-methyl)butyronnitrile (% on monomers) | 4.8 | — | — | — |
| TBP (% on monomers) | 1.7 | — | — | — |
| Reaction Conditions | | | | |
| Reaction Temperature (° C.) | 138 | 200 | 210 | 213 |
| Residence Time (minutes) | 420* | 12 | 12 | 12 |
| Product Characteristics | | | | |
| Mn | 2,297 | 2,228 | 2,229 | 2,147 |
| Mw | 5,638 | 5,785 | 5,611 | 5,451 |
| Epoxy equivalent weight | 476 | 487 | 498 | 498 |

*total reaction time; DTBP = di-tertiary butyl peroxide; TBP = tertiary butyl perbenzoate.

Example 7

Effect of Cyclohexyl Acrylate on Process Capability

To demonstrate the positive effects of the inclusion of non-functional acrylate monomers on the enhancement of this invention's processability, each one of the reaction mixtures shown in Table 7 was continuously supplied to different volume CSTRs each comprising a process similar to that described in FIG. 2 and Example 1. The 500ml CSTRs were utilized at 100% of usable volume (liquid full reactors), and the 10 gal CSTRs were utilized at less than 100% of usable volume (non-liquid full reactors). Regardless of the agitated reaction zone volume employed, the reaction zone average residence time was controlled at 12 minutes. The temperature of the CSTRs was maintained constant at different settings within the range of 193° C. to 232° C. The corresponding reaction products were continuously devolatized, collected, and analyzed as described in Example 1. The resulting polymeric product was substantially free of gel particles. The results are shown below in Table 7. The liquid full reactors showed no formation of gel fouling in the head spaces.

TABLE 7

| Monomer Mix (% w/w) | | | | | | |
|---|---|---|---|---|---|---|
| Glycidyl methacrylate | 45 | 45 | 45 | 45 | 45 | 30 |
| Styrene | 10 | 10 | 10 | 10 | 10 | 20 |
| Methyl methacrylate | 45 | 40 | 35 | 30 | 25 | 25 |
| Cyclohexyl acrylate | 0 | 5 | 10 | 15 | 20 | 25 |

TABLE 7-continued

| Other Ingredients (% w/w) | | | | | | |
|---|---|---|---|---|---|---|
| Xylene (% on total mix) | 9.25 | 9.5 | 9.5 | 9.5 | 9.5 | 9.5 |
| DTBP (% on total mix) | 0.75 | 0.5 | 0.5 | 0.5 | 0.5 | 0.5 |
| Reaction Conditions | | | | | | |
| Reaction Temperatures (° C.) | 193 204 207 | 193 213 218 | 193 210 221 | 193 210 227 | 193 207 232 | 193 207 210 232 |
| | 210 | | | | | |
| Reactor Zone Size | 10 gal | 500 ml | 500 ml | 500 ml | 500 ml | 10 gal |
| Residence Time (minutes) | 12 | 12 | 12 | 12 | 12 | 12 |

Figure 9:
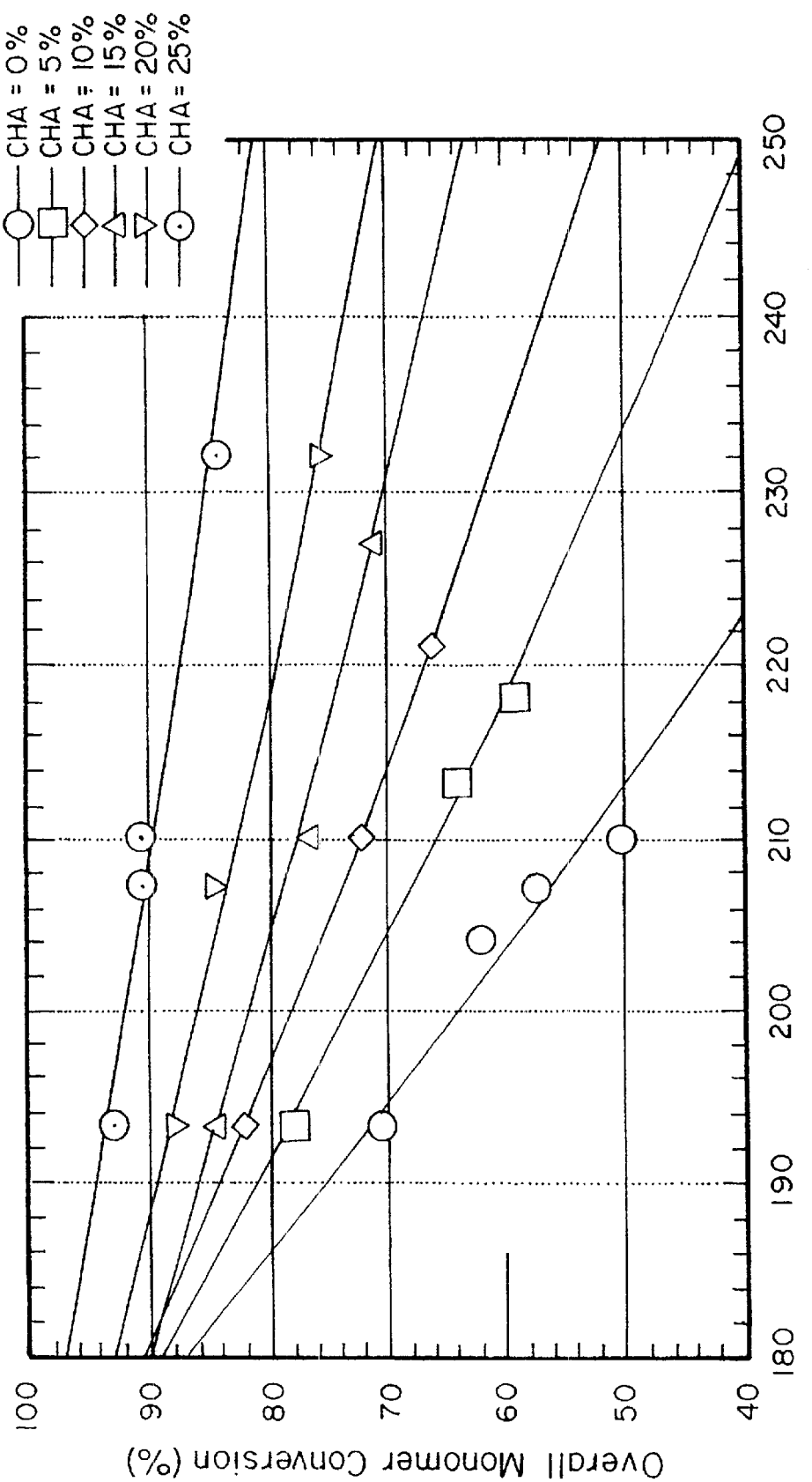
FIG. 9 is a graph illustrating the effect of the increase of overall monomer conversion as a function of an increase in concentration of non-functional acrylate monomer.

FIG. 9 shows the effect of the use of a suitable acrylate monomer, cyclohexyl acrylate (CHA) in this case, in process productivity, measured as overall monomer mix conversion to copolymer product in the process. As shown, with the introduction of as little as 5% CHA in the formula, a large increase in productivity is achieved over a widely expanded process range. The introduction of greater or equal than about 10% CHA allows a highly productive operation over the whole temperature range of this invention. The lines are best fit logarithmic curves between the corresponding experimental points.

Figure 10:
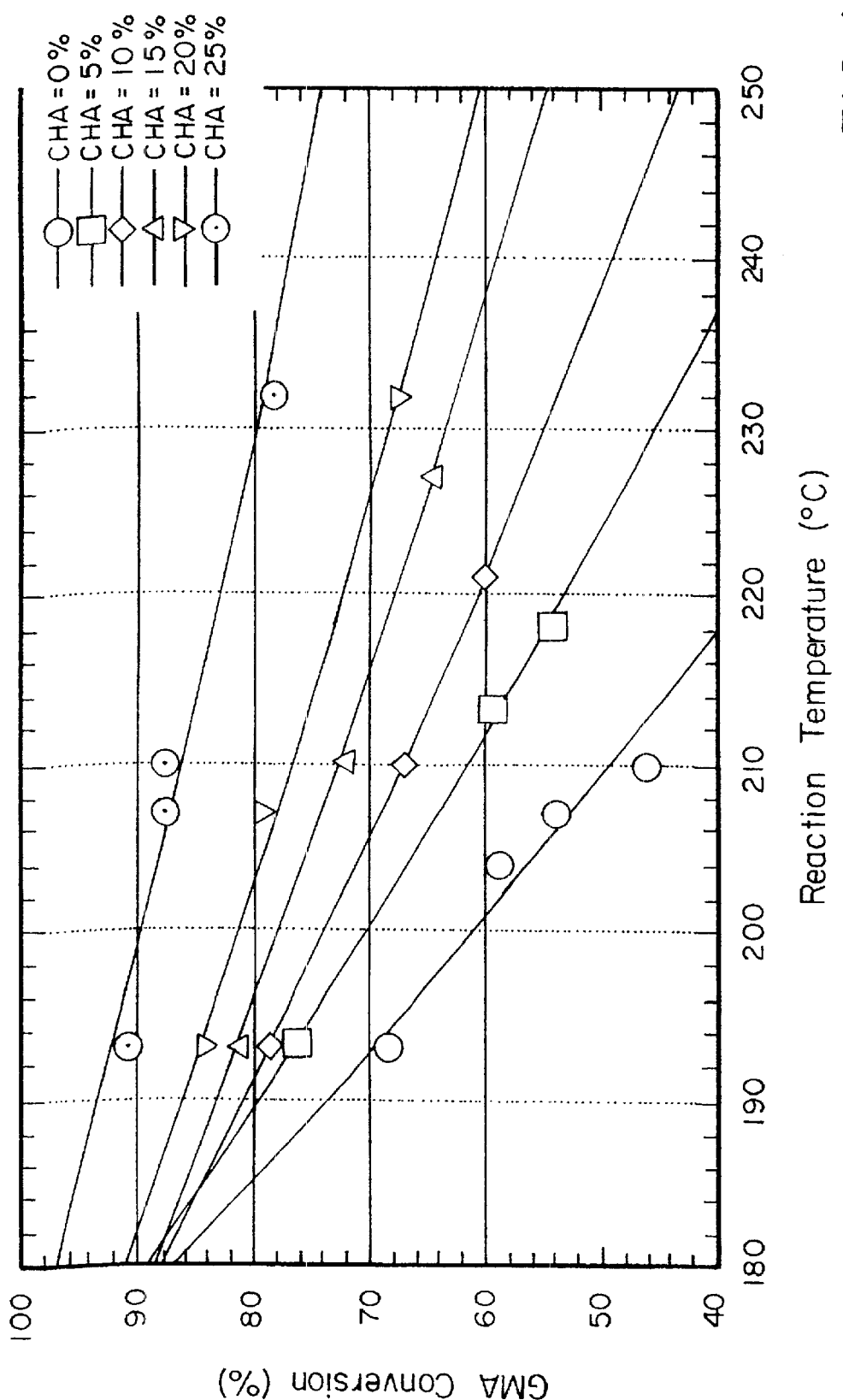
FIG. 10 is a graph illustrating the effect of the increase of epoxy-functional methacrylate monomer conversion as a function of an increase in concentration of non-functional acrylate monomer.

FIG. 10 shows the effect of the use of CHA on the epoxy-functional methacrylate monomer conversion and product functionality (measured as glycidyl methacrylate conversion). As shown, with the introduction of as little as 5% CHA in the formula a large increase in methacrylate conversion is achieved over a widely expanded process range. The introduction of greater than about 10% CHA allows a high methacrylate conversion over the whole temperature range of this invention. The lines are best fit logarithmic curves between the corresponding experimental points.

Figure 11:
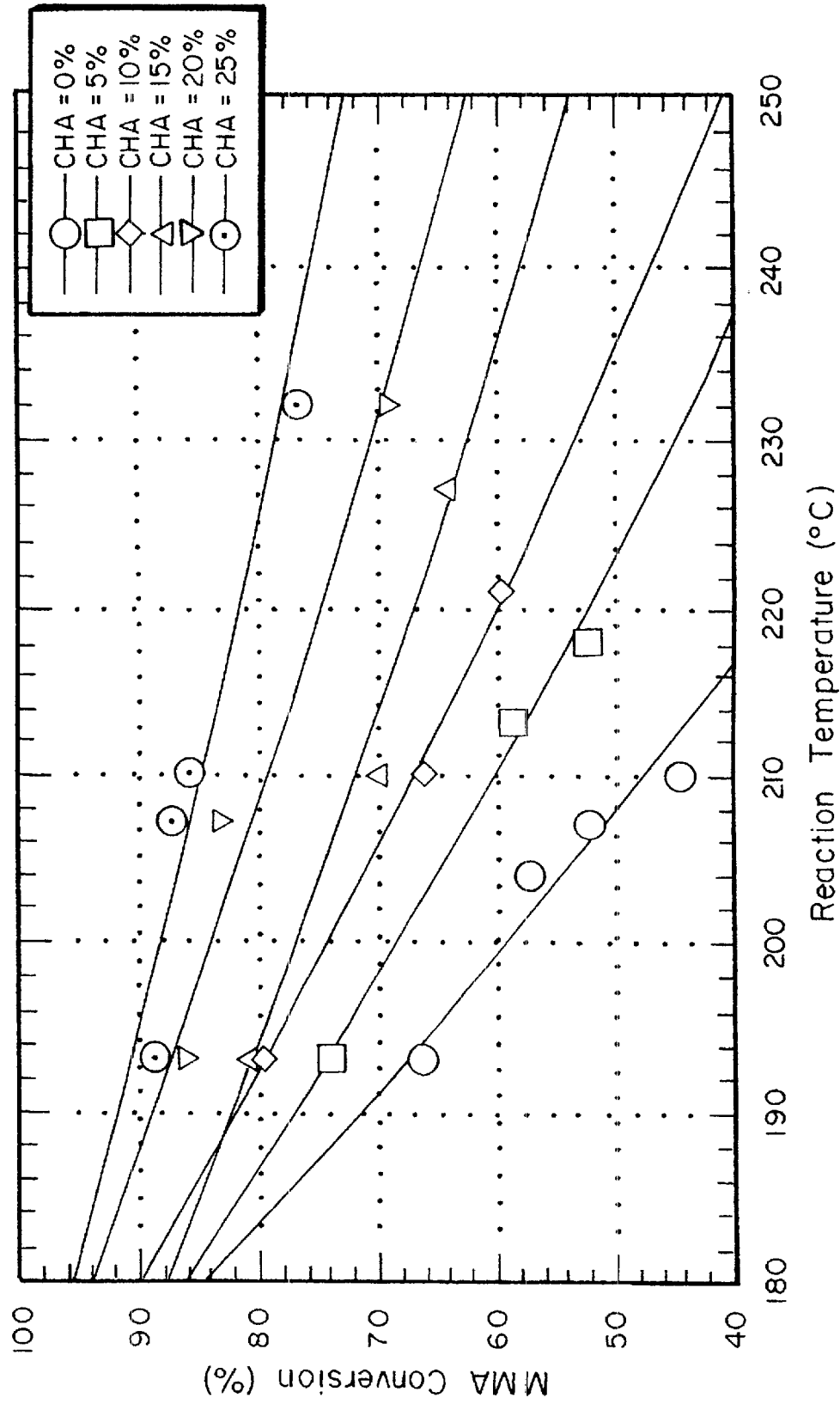
FIG. 11 is a graph illustrating the effect of the increase of non-functional methacrylate monomer conversion as a function of an increase in concentration of non-functional acrylate monomer.

FIG. 11 shows the effect of the use of CHA on the non-functional methacrylate monomer conversion. As shown, with the introduction of as little as 5% CHA in the formula a large increase in methacrylate conversion is achieved over a widely expanded process range. The introduction of greater than about 10% CHA allows a high methacrylate conversion over the whole temperature range of this invention. The lines are best fit logarithmic curves between the corresponding experimental points.

Figure 12:
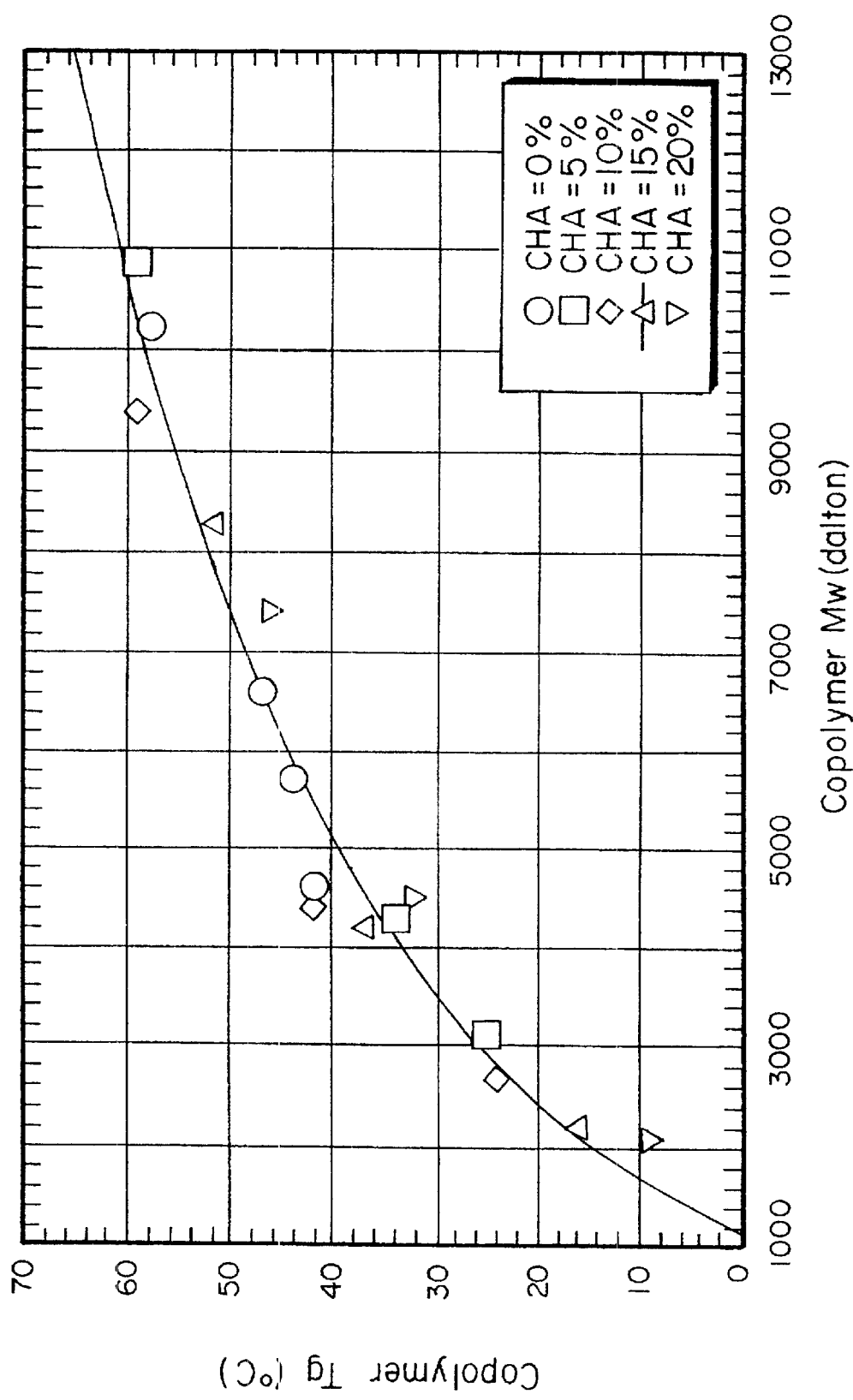
FIG. 12 is a graph illustrating the unmodified Mw vs. $T_g$ behavior of the different polymeric products of the present invention observed through the proper selection of the non-functional acrylate monomer.

FIG. 12 shows the unmodified Mw vs. $T_g$ behavior of the different products observed through the proper selection of the suitable acrylate monomer (in this case CHA replacing methyl methacrylate) compliant to Equation 1. The line at 30° C. represents an arbitrary cut point below which the copolymer product $T_g$ may be low for powder coating applications but still good for liquid coating applications. As shown, the introduction of up to 20% CHA in the formula in compliance to Equation 1 does not affect the $T_g$ of the product at a given Mw, nor does it affect the $T_g$ dependence with molecular weight. The line is the best fit logarithmic curve between the corresponding experimental points at CHA equal to 15%.

Example 8

Preparation of Epoxylated Polymeric Products with High Epoxy Content and High Styrene Content Via Continuous Process A reaction mixture of 45% glycidyl methacrylate, 45% styrene, 9% xylene and 1% di-tertiary butyl peroxide (monomer ratio =50% glycidyl methacrylate and 50%styrene) was continuously supplied to a reactor process similar to that described in Example 1. The reaction zone average residence time was controlled at 18 minutes in the agitated reaction zone. The temperature of the agitated reaction zone was maintained constant at different settings within the range of 182° C. to 227° C. The reaction product was continuously devolatilized, collected, and analyzed as described in Example 1. The resulting polymeric products were substantially free of gel particles.

The results are described in Table 8.

TABLE 8

| Monomer Mix (% w/w) | | | |
|---|---|---|---|
| Glycidyl Methacrylate | 50 | 50 | 50 |
| Styrene | 50 | 50 | 50 |
| Other Ingredients (% w/w) | | | |
| Xylene (% on total mix) | 9 | 9 | 9 |
| DTBP (% on total mix) | 1 | 1 | 1 |
| Reaction Conditions | | | |
| Reaction Temperature (° C.) | 182 | 204 | 227 |
| Residence Time | 18 | 18 | 18 |
| Product Characteristics | | | |
| Mn | 3132 | 2020 | 1319 |
| Mw | 10509 | 5136 | 2710 |
| Epoxy equivalent weight | 287 | 288 | 288 |

DTBP = di-tertiary butyl peroxide

Example 9

Comparative Preparation of Epoxylated Polymeric Products with High Epoxy Content and High Acrylate Content Via Continuous Process A reaction mixture of 45% glycidyl methacrylate, 45% butyl acrylate, 7% xylene and 3% di-tertiary butyl peroxide (monomer ratio =50% glycidyl methacrylate and 50% butyl acrylate) was continuously supplied to a reactor process similar to that described in Example 1. The reaction zone average residence time was controlled at 24 minutes in the agitated reaction zone. The temperature of the agitated reaction zone was maintained constant at 241° C. The reaction product was continuously devolatilized, collected, and analyzed as described in Example 1. The resulting polymeric products were substantially free of gel particles.

For process performance comparison a reaction mixture of 41% glycidyl methacrylate, 49% cyclohexyl acrylate, 7% xylene and 3% di-tertiary butyl peroxide (monomer ratio =45% glycidyl methacrylate and 55% cyclohexyl acrylate) was continuously supplied to a reactor process similar to that described in Example 1. The reaction zone average residence time was controlled at 24 minutes in the agitated reaction zone. The temperature of the agitated reaction zone was maintained constant at 241° C. The reaction product was continuously devolatilized, collected, and analyzed as described in Example 1. The resulting polymeric products were substantially free of gel particles.

The results are described in Table 9.

TABLE 9

| Monomer Mix (% w/w) | | |
|---|---|---|
| Glycidyl Methacrylate | 50 | 45 |
| Butyl Acrylate | 50 | — |
| Cyclohexyl Acrylate | — | 55 |

TABLE 9-continued

| Other Ingredients (% w/w) | | |
|---|---|---|
| Xylene (% on total mix) | 7 | 7 |
| DTBP (% on total mix) | 3 | 3 |
| Reaction Conditions | | |
| Reaction Temperature (° C.) | 241 | 241 |
| Residence Time | 24 | 24 |
| Product Characteristics | | |
| Mn | 974 | 916 |
| Mw | 1540 | 1573 |
| Epoxy equivalent weight | 292 | 327 |

DTBP = di-tertiary butyl peroxide

Example 10

Preparation of Epoxylated Polymeric Products with High Epoxy Content Via Continuous Process. Use of Isobornyl Acrylate for Improved Processability and Weatherability of Powder Resins. Comparative use of Di-tertiary Butyl Peroxide and Di-tertiary Amyl Peroxide A reaction mixture of 44% glycidyl methacrylate, 13% styrene, 18% methyl methacrylate, 13%isobornyl acrylate (IBA), 10% xylene and 2% di-tertiary butyl peroxide (monomer ratio =50% glycidyl methacrylate, 14.8% styrene, 20.4% methyl methacrylate, and 14.8% isobornyl acrylate) was continuously supplied to a reactor process comprising a 2 gallon CSTR. The reaction zone average residence time was controlled at 18 minutes in the agitated reaction zone. The temperature of the agitated reaction zone was maintained constant at different settings within the range of 171° C. to 1 82° C. The reaction product was continuously devolatilized, collected, and analyzed as described in Example 1. The resulting polymeric products were substantially free of gel particles.

For comparison purposes, a reaction mixture of 44% glycidyl methacrylate, 13% styrene, 18% methyl methacrylate, 13% isobornyl acrylate, 9.6% xylene and 2.4% di-tertiary amyl peroxide (monomer ratio =50% glycidyl methacrylate, 14.8% styrene, 20.4% methyl methacrylate, and 14.8% isobornyl acrylate) was continuously supplied to a reactor process comprising the same 2 gallon CSTR. The reaction zone average residence time was similarly controlled at 18 minutes in the agitated reaction zone. The temperature of the agitated reaction zone was also maintained constant at different settings within the range of 171° C. to 182° C. The reaction product was continuously devolatilized, collected, and analyzed as described in Example 1. The resulting polymeric products were substantially free of gel particles.

The comparative results are described in Table 10.

TABLE 10

| Monomer Mix (% w/w) | | | | | | |
|---|---|---|---|---|---|---|
| Glycidyl Methacrylate | 50.0 | 50.0 | 50.0 | 50.0 | 50.0 | 50.0 |
| Styrene | 14.8 | 14.8 | 14.8 | 14.8 | 14.8 | 14.8 |
| Methyl Methacrylate | 20.4 | 20.4 | 20.4 | 20.4 | 20.4 | 20.4 |
| Isobornyl Acrylate | 14.8 | 14.8 | 14.8 | 14.8 | 14.8 | 14.8 |

TABLE 10-continued

| | Other Ingredients (% w/w) | | | | | |
|---|---|---|---|---|---|---|
| Xylene (% on total mix) | 10.0 | 9.6 | 10.0 | 9.6 | 10.0 | 9.6 |
| DTBP (% on total mix) | 2.0 | — | 2.0 | — | 2.0 | — |
| DTAP (% on total mix) | — | 2.4 | — | 2.4 | — | 2.4 |
| | Reaction Conditions | | | | | |
| Reaction Temperature (° C.) | 171 | 171 | 177 | 177 | 182 | 182 |
| Residence Time (minutes) | 18 | 18 | 18 | 18 | 18 | 18 |
| | Product Charactersitics | | | | | |
| Mn | 2,290 | 2,187 | 1,954 | 1,888 | 1,692 | 1,648 |
| Mw | 7,037 | 5,253 | 5,225 | 4,251 | 4,151 | 3,484 |
| Mz | 15,216 | 9,199 | 10,862 | 7,335 | 8,852 | 5,996 |
| Epoxy equivalent weight | 290 | 292 | 293 | 295 | 295 | 297 |

DTBP = di-tertiary butyl peroxide
DTAP = di-tertiary amyl peroxide

Example 11

Preparation of Epoxylated Polymeric Products with High Epoxy Content Via Continuous Process. Use of High Styrene and Acrylate Content for Improved Processability of Liquid Resins A reaction mixture of 45% glycidyl methacrylate, 27% styrene, 18% 2-ethylhexyl acrylate, 9% xylene and 1% di-tertiary butyl peroxide (monomer ratio =50% glycidyl methacrylate, 30% styrene, and 20% 2-ethylhexyl acrylate) was continuously supplied to a reactor process similar to that described in Example 1. The reaction zone average residence time was controlled at 12 minutes in the agitated reaction zone. The temperature of the agitated reaction zone was maintained constant at different settings within the range of 204° C. to 232° C. The reaction product was continuously devolatilized, collected, and analyzed as described in Example 1. The resulting polymeric products were substantially free of gel particles.

The results are described in Table 11.

TABLE 11

| | Monomer Mix (% w/w) | | |
|---|---|---|---|
| Glycidyl Methacrylate | 50 | 50 | 50 |
| Styrene | 30 | 30 | 30 |
| 2-Ethylhexyl Acrylate | 20 | 20 | 20 |
| | Other Ingredients (% w/w) | | |
| Xylene (% on total mix) | 9 | 9 | 9 |
| DTBP (% on total mix) | 1 | 1 | 1 |
| | Reaction Conditions | | |
| Reaction Temperature (° C.) | 204 | 218 | 232 |
| Residence Time | 12 | 12 | 12 |
| | Product Characteristics | | |
| Mn | 1901 | 1443 | 1148 |
| Mw | 4734 | 3056 | 2162 |
| Epoxy equivalent weight | 287 | 290 | 293 |

DTBP = di-tertiary butyl peroxide

Example 12

Preparation of Epoxylated Polymeric Products with High Epoxy Content and No Gel Content Via Continuous Process Using A Liquid Full Reactor A high epoxy content polymer was prepared in a continuous reaction run in a liquid full reactor scheme as illustrated in FIG. 13 and described below. The feed solution contained the materials listed below in Table 12 and is fed from a feed tank 30 via a pump 32 to a reactor 34 (500 ml). The reactor 34 is utilized in a liquid full manner, i.e. at 100% of its usable volume, for the radical copolymerization of GMA. The temperature of the reactor 34 is maintained via an oil jacket 36. This appropriate pressure in the reactor 34 is monitored by a pressure gauge 38 and maintained by a control valve 40 and a controller. The materials within the reactor 34 are mixed by an agitator 49 which was sealed with nitrogen gas. The feed solution is fed to the reactor 34 by a feed line 48. The polymeric product is removed from reactor 34 by product line 46, which is heated by an oil jacket. The polymeric product is then collected.

The process was conducted as follows. The pressure of nitrogen gas for sealing the agitator 42 was adjusted to 2.0 MPa. EEP (solvent) was fed to the reactor 34 to fill the reactor 34. The feed solution was then prepared and added into the feed tank 30. The set value of the controller was set at 2.0 MPa. The temperature of the oil jacket 36 was elevated to about 170° C. The reactor temperature rose to 150° C. The feed solution was then fed to the reactor 34 at a rate of 41.0 g/min. The pressure within the reactor 34 was brought to the set value of 2.0 MPa. The pressure in the reactor 34 was instable because of pumping. The nitrogen gas for agitator sealing was applied to the reactor 34, and the pressure in the reactor 34 became stable at 2.0 MPA. The oil jacket temperature was then elevated to about 245 ° C.–250° C. to keep the reactor temperature at 235° C. The agitator speed was 1160 rpm. The residence time was 12 min. The reaction temperature was maintained at 235° C. The process was kept at a steady state for one hour before sampling. Polymerized mixture was continuously fed to the evaporator 44 via product line 46 to remove the residual monomers and solvents. The polymeric product without volatile components was collected continuously. After 260 min., to wash the evaporator 44 and the feed and product lines 46 and 48, solvent was fed to the process for at least one hour. After polymerization, the reactor 34 was opened and inspected. The inside of reactor 34 was very clean. There was no evidence of gel in the reactor 34. The conversion of the polymerization was 85.3%. Mw and MN from GPC measurement were 2940 and 1380. The results are shown below in Table 13 as Examples 12-1 and 12-2.

Further tests were performed using the same liquid full system, where the temperatures and composition of the feed solution were varied. The results of these further tests are given below in Table 13 as Examples 12-3 through 12-5.

TABLE 12

| Feed Solution | |
|---|---|
| Glycidyl Methacrylate (GMA) | 44 wt. parts |
| Styrene | 20 wt. parts |
| Methyl Methacrylate | 5 wt. parts |
| Butyl Acrylate | 19 wt. parts |
| 2-Hydroxyethyl Methacrylate | 12 wt. parts |
| Xylene | 20 wt. parts |
| DTBP | 0.5 wt. parts |

TABLE 13

Examples of Copolymerization of Glycidyl Methacrylate

| Name | | Example 12-1 | Example 12-2 | Example 12-3 | Example 12-4 | Example 12-5 |
|---|---|---|---|---|---|---|
| Reactor System | | Liquid Full | Liquid Full | Liquid Full | Liquid Full | Liquid Full |
| Temp. | (° C.) | 235 | 190 | 185 | 235 | 185 |
| Jacket Temp. | (° C.) | 245 | 195 | 190 | 246 | — |
| Reactor Pressure | (MPa) | 2.0 | 1.0 | 1 | 1 | 1 |
| Residence Time | (min.) | 12 | 12 | 12 | 12 | 12 |
| WFE-temp. | (° C.) | 240 | 240 | 240 | 240 | 240 |
| WFE-pressure | (kPa) | 30 | 30 | 30 | 30 | 30 |
| Feed Composition (wt. parts) | (GMA) | 44 | 55 | 25 | 35 | 25 |
| | St. | 20 | 45 | 15 | 10 | 38 |
| | MMA | 5 | — | 43 | — | 29 |
| | BA | 19 | — | — | — | 8 |
| | HEMA | 12 | — | — | 21 | — |
| | CHA | — | — | 17 | — | — |
| | IBA | — | — | — | 19 | — |
| | IBXA | — | — | — | 15 | — |
| | Xylene | 20 | 20.0 | 20.0 | 30 | 20 |
| | DTBP | 0.5 | 0.25 | 1.0 | 0.5 | 1.0 |
| | Total | 120.5 | 120.3 | 121.0 | 130.5 | 121.0 |
| Conversion | (%) | 85.3 | 87.7 | 85.4 | 90 | 91 |
| Run Time | (min.) | 260 | 200 | 290 | 240 | 300 |
| Mw | GPC | 2940 | 19100 | 6280 | 2700 | 11600 |
| Mn | GPC | 1380 | 10400 | 2460 | 1260 | 4200 |
| Mw/Mn | | 2.13 | 1.84 | 2.55 | 2.14 | 2.76 |
| Gel in the reactor | | Free | Free | Free | Free | Free |

Example 13

Preparation of Acrylic Acid Polymeric Products with High Acrylic Acid Content and No Gel Content Via Continuous Process Using A Liquid Full Reactor.

The reactor scheme shown in FIG. 13 and described in Example 12 was utilized to demonstrate the continuous production of a polymer having a high content of acrylic acid monomers with no gel content. The process was conducted as described in Example 12, with the feed solution containing the materials described below in Table 14. As shown in Table 14, the resulting polymeric products had a high conversion of acrylic acid monomers, with no gel formed within the reactor when using a liquid full reactor.

TABLE 14

| Name | | Example 13-1 | Example 13-2 | Example 13-3 |
|---|---|---|---|---|
| Reactor System | | Liquid Full | Liquid Full | Liquid Full |
| Temp. | (° C.) | 250 | 270 | 295 |
| Jacket Temp. | (° C.) | 255 | 276 | 300 |
| Reactor Pressure | (Mpa) | 2.5 | 2.5 | 3.0 |
| Residence Time | (min.) | 12.1 | 12.1 | 12.1 |
| WFE-temp. | (° C.) | 240 | 240 | 240 |
| WFE-pressure | (kPa) | 30 | 30 | 30 |
| Feed Composition (wt. parts) | CHA | 65 | 65 | — |
| | BA | 0 | 0 | 65 |
| | AA | 35 | 35 | 35 |
| | MEK | 1 | 1 | 1 |
| | DTBP | 0.1 | 0.1 | 0.1 |
| | Total | 101.1 | 101.1 | 101.1 |
| Conversion | (%) | 84.3 | 75.1 | 63 |
| Run Time | (min.) | 150 | 150 | 250 |

TABLE 14-continued

| Name | | Example 13-1 | Example 13-2 | Example 13-3 |
|---|---|---|---|---|
| Mw | GPC | 5470 | 3070 | 2810 |
| Mn | GPC | 1920 | 1420 | 1430 |
| Mw/Mn | | 2.85 | 2.16 | 1.97 |
| Gel in the Reactor | | Free | Free | Free |

It is understood that the invention is not confined to the particular formulations and arrangements of parts herein illustrated and described, but embraces all such modified forms thereof as come within the scope of the following claims.

What is claimed is:

1. A continuous, high temperature polymerization process for preparing a free radically polymerized polymeric product comprising:
   (a) continuously charging into a reactor monomers consisting essentially of:
      (i) at least one epoxy-functional acrylic monomer; and
      (ii) at least one additional monoethylenically unsaturated free radical polymerizable monomer, such that the reactor is filled to 100 percent of its usable volume; and
   (b) polymerizing the monomers at a temperature of 190° to 270° C. to produce a polymeric product, wherein the reactor is filled to 100 percent of its usable volume during the polymerization of the monomers, such that the polymeric product is formed substantially free of gel particles.

2. The continuous, high temperature polymerization process of claim 1, wherein the polymeric product is an addition polymer.

3. The continuous, high temperature polymerization process of claim 1, wherein the residence time of the monomers within the reactor is less than 60 minutes.

4. The continuous, high temperature polymerization process of claim 1, wherein (a) further comprises continuously charging into the reactor one or more additional compounds selected from the group consisting of solvents, free radical polymerization initiators and combinations thereof.

5. The continuous, high temperature polymerization process of claim 4, wherein (a) further comprises continuously charging into the reactor one or more solvents in an amount up to 40 percent by weight of the total weight of the monomers.

6. The continuous, high temperature polymerization process of claim 4, wherein the free radical polymerization initiator is di-t-amyl peroxide.

7. The continuous, high temperature polymerization process of claim 1, wherein the process further comprises maintaining a constant pressure above atmospheric pressure within the reactor.

8. The continuous, high temperature polymerization process of claim 7, wherein the constant pressure is maintained within the reactor by the addition of an inert gas.

9. The continuous, high temperature polymerization process of claim 1, wherein the epoxy-functional acrylic monomer is glycidyl methacrylate.

10. The continuous, high temperature polymerization process of claim 1, wherein the additional free radical polymerizable monoethylenically unsaturated monomer(s) are selected from the group consisting of non-functional methacrylate monomers, non-functional acrylate monomers, non-functional styrenic monomers and combinations thereof.

11. The continuous, high temperature polymerization process of claim 10, wherein the non-functional free radical polymerizable monomers further comprise at least one non-functional methacrylate monomer and at least one non-functional acrylate monomer.

12. The continuous, high temperature polymerization process of claim 10, wherein the non-functional free radical polymerizable monoethylenically unsaturated monomers further comprise at least two different non-functional methacrylate monomers and at least one non-functional acrylate monomer.

13. The continuous, high temperature polymerization process of claim 10, wherein the non-functional free radical polymerizable monoethylenically unsaturated monomers further comprise at least two different non-functional methacrylate monomers, at least one non-functional acrylate monomer, and at least one non-functional styrenic monomer.

14. The continuous, high temperature polymerization process of claim 10, wherein the monomers consist essentially of epoxy-functional acrylic monomer(s) and non-functional styrenic monomer(s).

15. The continuous, high temperature polymerization process of claim 10, wherein (a) further comprises continuously charging into the reactor monomers consisting essentially of:
(i) from about 1 percent to 100 percent by weight of at least one epoxy-functional acrylic monomer based on the total weight of the polymerizable monomers;
(ii) from 1 percent to about 99 percent by weight of at least one non-functional free radical polymerizable monomer based on the total weight of the polymerizable monomers; and
(iii) at least one free radical polymerization initiator.

16. The continuous, high temperature polymerization process of claim 10, wherein (a) further comprises continuously charging into the reactor monomers consisting essentially of:
(i) about 15 percent to about 60 percent by weight of at least one epoxy-functional acrylic monomer based on the total weight of the polymerizable monomers;
(ii) from 1 to about 85 percent by weight of at least one non-functional monomer selected from the group consisting of non-functional acrylate monomers, non-functional methacrylate monomers, and combinations thereof based on the total weight of the polymerizable monomers;
(iii) about 0.0005 to about 0.06 moles of at least one free radical polymerization initiator per mole of monomers;
(iv) 0 percent to about 25 percent by weight of at least one non-functional styrenic monomer based on the total weight of the polymerizable monomers; and
(v) 0 percent to about 15 percent by weight of solvent based on the total weight of the polymerizable monomers.

17. The continuous, high temperature polymerization process of claim 16, wherein the non-functional methacrylate and non-functional acrylate monomers are selected from the group consisting of methyl methacrylate, butyl methacrylate, butyl acrylate, isobutyl methacrylate, cyclohexyl methacrylate, cyclohexyl acrylate, isobornyl acrylate, isobornyl methacrylate and combinations thereof.

18. The continuous, high temperature polymerization process of claim 1, wherein (a) further comprises continuously charging into the reactor at least one hydroxy-functional acrylic monomer.

19. The continuous, high temperature polymerization process of claim 18, wherein the epoxy-functional acrylic monomer is glycidyl methacrylate.

20. The continuous, high temperature polymerization process of claim 18, wherein the hydroxy-functional acrylic monomer is 2-hydroxyethyl methacrylate.

21. The continuous, high temperature polymerization process of claim 18, wherein the monomers further comprise at least one additional free radical polymerizable monomer.

22. The continuous, high temperature polymerization process of claim 21, wherein the additional free radical polymerizable monomer(s) are selected from the group consisting of non-functional methacrylate monomers, non-functional acrylate monomers, non-functional styrenic monomers and combinations thereof.

23. The continuous, high temperature polymerization process of claim 22, wherein the free radical polymerizable monomers further comprise at least one non-functional methacrylate monomer and at least one non-functional acrylate monomer.

24. The continuous, high temperature polymerization process of claim 22, wherein the free radical polymerizable monomers further comprise at least two different non-functional methacrylate monomers and at least one non-functional acrylate monomer.

25. The continuous, high temperature polymerization process of claim 22, wherein the free radical polymerizable monomers further comprise at least two different non-functional methacrylate monomers, at least one non-functional acrylate monomer, and at least one non-functional styrenic monomer.

26. The continuous, high temperature process of claim 22, wherein (a) further comprises continuously charging into the reactor monomers consisting essentially of:
(i) about 1 percent to about 75 percent by weight of at least one epoxy-functional acrylic monomer based on the total weight of the polymerizable monomers;
(ii) about 1 percent to about 75 percent by weight of at least one hydroxy-functional acrylic monomer based on the total weight of the polymerizable monomers, such that the combined weights of the epoxy-functional acrylic monomer(s) and the hydroxy-functional acrylic monomer(s) does not exceed 75 percent of the total weight of the polymerizable monomers;

(iii) about 25 to about 98 percent by weight of at least one non-functional free radical polymerizable monomer based on the total weight of the polymerizable monomers; and (iv) at least one free radical polymerizable initiator.

27. The continuous, high temperature polymerization process of claim 1, wherein the monomer(s) comprise at least one carboxylic acid-functional acrylic monomer.

28. The continuous, continuous, high temperature polymerization process of claim 27, wherein the carboxylic acid-functional acrylic monomer is acrylic acid.

29. The continuous, high temperature polymerization process of claim 27, wherein the monomers further comprise at least one additional free radical polymerizable monomer.

30. The continuous, high temperature polymerization process of claim 29, wherein the additional free radical polymerizable monomer(s) are selected from the group consisting of non-functional methacrylate monomers, non-functional acrylate monomers, non-functional styrenic monomers and combinations thereof.

31. The continuous, high temperature polymerization process of claim 30, wherein the free radical polymerizable monomers further comprise at least one non-functional methacrylate monomer and at least one non-functional acrylate monomer.

32. The continuous, high temperature polymerization process of claim 30, wherein the free radical polymerizable monomers further comprise at least two different non-functional methacrylate monomers and at least one non-functional acrylate monomer.

33. The continuous, high temperature polymerization process of claim 30, wherein the free radical polymerizable monomers further comprise at least two different non-functional methacrylate monomers, at least one non-functional acrylate monomer, and at least one non-functional styrenic monomer.

34. The continuous, continuous, high temperature polymerization process of claim 30, wherein (a) further comprises continuously charging into the reactor:

(i) from about 5 percent to 99 percent by weight of at least one carboxylic acid-functional acrylic monomer based on the total weight of the polymerizable monomers;

(ii) from 1 percent to about 95 percent by weight of at least one non-functional free radical polymerizable monomer based on the total weight of the polymerizable monomers; and (iii) at least one free radical polymerization initiator.

35. A powder coating composition, comprising:

(a) the polymeric product made according to the process of claim 1; and (b) materials sufficient to form a powder coating composition when combined with the polymeric product.

36. A liquid coating composition, comprising:

(a) the polymeric product made according to the process of claim 1; and (b) materials sufficient to form a liquid coating composition when combined with the polymeric product.

37. The continuous, high temperature polymerization process of claim 1, wherein the additional free radical polymerizable monomer is a hydroxyl-functional acrylic monomer.

* * * * *